United States Patent
Pizzo et al.

(10) Patent No.: US 10,582,032 B2
(45) Date of Patent: *Mar. 3, 2020

(54) MULTI-LAYER HANDHELD ELECTRONIC DEVICE

(71) Applicant: HoudiniX LLC, Eastsound, WA (US)

(72) Inventors: Stephen G. Pizzo, Encino, CA (US); Peter Jarred Land, Los Angeles, CA (US); James H. Jannard, Las Vegas, NV (US); Hector Ortega, Pacific Palisades, CA (US)

(73) Assignee: HOUDINIX LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/891,615

(22) Filed: Feb. 8, 2018

(65) Prior Publication Data

US 2018/0167497 A1 Jun. 14, 2018

Related U.S. Application Data

(63) Continuation of application No. 14/821,637, filed on Aug. 7, 2015, now Pat. No. 9,917,935, which is a
(Continued)

(51) Int. Cl.
  *H04M 1/02* (2006.01)
  *H04B 1/3888* (2015.01)
  *G06F 1/16* (2006.01)
(52) U.S. Cl.
  CPC .......... *H04M 1/026* (2013.01); *G06F 1/1686* (2013.01); *H04B 1/3888* (2013.01);
(Continued)

(58) Field of Classification Search
  CPC ............. H04M 1/0202; H04M 1/0264; H04M 1/0279; H04M 1/3888; H04M 2250/22;
  (Continued)

(56) References Cited

U.S. PATENT DOCUMENTS

| | | |
|---|---|---|
| D175,073 S | 7/1955 | Heller |
| 3,559,542 A | 2/1971 | Clapp |

(Continued)

FOREIGN PATENT DOCUMENTS

| | | |
|---|---|---|
| CN | 202103723 U | 1/2012 |
| CN | 103018875 A | 4/2013 |

(Continued)

OTHER PUBLICATIONS

"RunboX6 Review: One of the best rugged, waterproof and shock-proof, IP67 smartphone", BMR Reviews (Year: 2016).*

(Continued)

*Primary Examiner* — Raymond S Dean
(74) *Attorney, Agent, or Firm* — Mintz, Levin, Cohn, Ferris, Glovsky and Popeo, P.C.

(57) ABSTRACT

Disclosed is a housing for a portable handheld electronic device such as a cellphone. The device has a housing, having a left side and right side. The housing can be layered, such as in a sandwich configuration. The layers can be secured together via one or more fasteners that extend through at least front and rear plates of the housing.

23 Claims, 15 Drawing Sheets

Related U.S. Application Data continuation-in-part of application No. 14/247,160, filed on Apr. 7, 2014, now Pat. No. 9,621,690.

(60) Provisional application No. 62/034,446, filed on Aug. 7, 2014, provisional application No. 61/947,889, filed on Mar. 4, 2014.

(52) U.S. Cl.
CPC ....... *H04M 1/0264* (2013.01); *H04M 1/0279* (2013.01); *G06F 1/1688* (2013.01)

(58) Field of Classification Search
CPC ....... G03B 15/03; G03B 15/05; G06F 1/1626; G06F 1/1686
See application file for complete search history.

(56) References Cited

U.S. PATENT DOCUMENTS

| | | |
|---|---|---|
| D221,720 S | 8/1971 | Hoskins |
| D244,209 S | 5/1977 | Bliven |
| 4,239,364 A | 12/1980 | Doi |
| D270,061 S | 8/1983 | Ackeret |
| D274,674 S | 7/1984 | Allen |
| D279,673 S | 7/1985 | Rivette et al. |
| 4,659,203 A | 4/1987 | Niwa et al. |
| D316,409 S | 4/1991 | Sharbaugh |
| D316,410 S | 4/1991 | Watanabe et al. |
| 5,005,948 A | 4/1991 | Takahashi |
| D319,059 S | 8/1991 | Divine |
| D352,936 S | 11/1994 | Karlin |
| 5,371,790 A | 12/1994 | Nevo et al. |
| D357,256 S | 4/1995 | Jardine |
| D357,918 S | 5/1995 | Doria |
| D358,177 S | 5/1995 | Imai |
| D375,950 S | 11/1996 | Jones et al. |
| D380,449 S | 7/1997 | Palatov |
| 5,805,256 A | 9/1998 | Miller |
| 5,805,474 A | 9/1998 | Danielson et al. |
| D407,396 S | 3/1999 | Ogasawara |
| 5,925,873 A | 7/1999 | Kumar |
| D418,132 S | 12/1999 | Zoiss et al. |
| D427,172 S | 6/2000 | Bequir |
| D427,983 S | 7/2000 | Nagano et al. |
| 6,164,853 A | 12/2000 | Foote |
| D459,712 S | 7/2002 | Langford |
| D460,059 S | 7/2002 | Chan |
| D480,375 S | 10/2003 | Cebe et al. |
| D487,440 S | 3/2004 | Langford |
| D487,442 S | 3/2004 | Wang |
| D503,708 S | 4/2005 | Kolinen |
| 6,925,315 B2 | 8/2005 | Langford |
| D511,773 S | 11/2005 | Horiki et al. |
| D515,079 S | 2/2006 | Lodato et al. |
| D524,281 S | 7/2006 | Franck et al. |
| D528,110 S | 9/2006 | Cohn |
| D529,466 S | 10/2006 | Rose et al. |
| D535,636 S | 1/2007 | Cooper |
| D537,814 S | 3/2007 | Okada |
| D578,718 S | 10/2008 | Bettanin |
| D587,416 S | 2/2009 | Ashe |
| D591,018 S | 4/2009 | Bogaerts |
| D602,665 S | 10/2009 | Porcini |
| D606,527 S | 12/2009 | Chen |
| D612,823 S | 3/2010 | Mazzeo |
| D615,973 S | 5/2010 | Sip et al. |
| D616,851 S | 6/2010 | Roka |
| D624,601 S | 9/2010 | Grossman |
| D635,971 S | 4/2011 | Sip et al. |
| D639,260 S | 6/2011 | Carroll |
| D641,735 S | 7/2011 | Santa Maria et al. |
| 8,019,216 B2 | 9/2011 | Jannard |
| 8,068,168 B2 | 11/2011 | Haubmann |
| D657,514 S | 4/2012 | Pedriza |
| 8,153,270 B2 | 4/2012 | Akieda |
| 8,155,692 B1 | 4/2012 | Roka |
| D660,295 S | 5/2012 | Mak |
| 8,180,411 B2 | 5/2012 | Skagmo |
| 8,180,441 B2 | 5/2012 | Skagmo |
| D662,925 S | 7/2012 | Mayberry et al. |
| D663,724 S | 7/2012 | Lee et al. |
| D667,187 S | 9/2012 | Sowinski |
| 8,290,360 B2 | 10/2012 | Jannard |
| D671,931 S | 12/2012 | Fathollahi |
| 8,477,238 B2 | 7/2013 | Jannard |
| D688,233 S | 8/2013 | Dong |
| 8,525,924 B2 | 9/2013 | Jannard |
| 8,525,925 B2 | 9/2013 | Jannard |
| 8,593,745 B2 | 11/2013 | O'Neill |
| D695,478 S | 12/2013 | Hobe |
| 8,671,498 B2 | 3/2014 | Ferlito |
| 8,687,299 B1 | 4/2014 | Sanford et al. |
| 8,773,581 B2 | 7/2014 | Jannard |
| 8,830,607 B2 | 9/2014 | Iinuma et al. |
| 8,913,179 B2 | 12/2014 | Jannard |
| D723,529 S | 3/2015 | Song |
| 9,013,397 B2 | 4/2015 | Jannard |
| D740,281 S | 10/2015 | Kim |
| 9,288,295 B2 | 3/2016 | Ivanovski |
| D753,622 S | 4/2016 | Lee |
| D754,124 S | 4/2016 | Kim |
| D756,324 S | 5/2016 | Tosh |
| D762,633 S | 8/2016 | Fife |
| D763,250 S | 8/2016 | Jannard |
| D767,563 S | 9/2016 | Satzger |
| 9,568,808 B2 | 2/2017 | Pizzo et al. |
| 9,583,285 B1 | 2/2017 | Andre |
| 9,621,690 B2* | 4/2017 | Jannard ............... H04M 1/0202 |
| 9,628,679 B2 | 4/2017 | Jannard |
| 9,712,728 B2 | 7/2017 | Jannard |
| 9,871,900 B2* | 1/2018 | Jannard ............... H04M 1/0202 |
| 9,917,935 B2 | 3/2018 | Pizzo et al. |
| 10,101,639 B2 | 10/2018 | Pizzo et al. |
| 2001/0024945 A1 | 9/2001 | Inomata et al. |
| 2003/0083020 A1 | 5/2003 | Langford |
| 2003/0137802 A1 | 7/2003 | Von Novak |
| 2005/0141199 A1 | 6/2005 | Chiou |
| 2006/0083913 A1 | 4/2006 | Armaly |
| 2006/0216023 A1 | 9/2006 | Tokiwa |
| 2007/0140681 A1 | 6/2007 | Tanaka |
| 2008/0002968 A1 | 1/2008 | Arai |
| 2009/0251423 A1 | 10/2009 | Jung |
| 2009/0270135 A1 | 10/2009 | Shoji et al. |
| 2009/0291709 A1 | 11/2009 | Lee |
| 2010/0203929 A1 | 8/2010 | Skagmo et al. |
| 2011/0032666 A1 | 2/2011 | Gideonse |
| 2011/0115679 A1 | 5/2011 | Kong |
| 2011/0309728 A1 | 12/2011 | Diebel |
| 2012/0093494 A1 | 4/2012 | Wang |
| 2013/0002939 A1 | 1/2013 | O'Neill |
| 2013/0077953 A1 | 3/2013 | Kikuchi |
| 2013/0265662 A1 | 10/2013 | Araie |
| 2013/0307769 A1 | 11/2013 | Sharma |
| 2014/0071547 A1 | 3/2014 | O'Neill |
| 2014/0071548 A1 | 3/2014 | Sanford et al. |
| 2014/0098509 A1 | 4/2014 | Tomoe |
| 2014/0128132 A1 | 5/2014 | Cox |
| 2015/0042877 A1* | 2/2015 | O'Neill ............... H04N 5/2254 348/376 |
| 2015/0076190 A1 | 3/2015 | deSouza |
| 2015/0256655 A1 | 9/2015 | Jannard |
| 2016/0044148 A1 | 2/2016 | Pizzo |
| 2017/0214777 A1 | 7/2017 | Jannard et al. |

FOREIGN PATENT DOCUMENTS

| | | |
|---|---|---|
| CN | 203261364 U | 10/2013 |
| CN | 203261368 U | 10/2013 |
| EP | 1096759 | 5/2001 |
| EP | 1096759 A1 | 5/2001 |
| JP | 5-227078 | 9/1993 |
| JP | 2001-336965 | 12/2001 |
| JP | 2003-057742 | 2/2003 |

(56) References Cited

FOREIGN PATENT DOCUMENTS

| JP | 2005-112383 | | 4/2005 |
| JP | 2007-286201 | | 11/2007 |
| JP | 2010-145707 | | 7/2010 |
| JP | 2011-081331 | | 4/2011 |
| JP | 2011-095689 | | 5/2011 |
| JP | 2013-235074 | A | 11/2013 |
| JP | 2014-157248 | A | 8/2014 |

OTHER PUBLICATIONS

"Meet the toughest, most durable rugged smartphones money can buy", www.phonearena.com (Year: 2014).*
International Search Report and Written Opinion for International Application No. PCT/US2015/018125, dated Jul. 1, 2015.
"Epic Dragon Features" https://web.archive.org/web/20130726055056/http://www.red.com/products/epic-dragon#features,www.red.com, www.red.comlproducts/epic-dragon#features, www.archive.org, indicates available online Jul. 26, 2013, in 3 pages.
"Epic Dragon Overview", https://web.archive.org/web/20130726055056/http://www.red.com/products/epic-dragon,www.archive.org indicates available online Jul. 26, 2013, in 3 pages.
"Fotodiox Pro Lens Adapter, Arri PL Mount lens to Sony E-Mount Mirrorless Camera such as NEX VG-10, FS-700", Amazon.corn, http://www.amazon.com/Fotodiox-Adapter-PL-mount-Mirroless/dp/B008BBI4OE, document states that Fotodiox product was first available at Amazon.com on Jun. 13, 2012, in 6 pages.
"Meet the toughest, most durable smartphones money can buy", Jan. 24, 2014, www.phonearena.com.
"Micro Four Thirds System", Wikipedia.org, https://web.archive.org/web/20130424201648/http://en.wikipedia.org/wiki/Micro Four_Thirds_System, web.archive.org indicates available on Apr. 24, 2013, in 19 pages.
"Sony E-mount", Wikipedia.org, https://web.archive.org/web/20131211063640/http://en.wikipedia.org/wiki/Sony_E-mount,web.archive.org indicates available online on Dec. 11, 2013, in 7 pages.
International Search Report and Written Opinion for PCT Application No. PCT/US2015/044285, dated Jan. 15, 2016.
Invitation to Pay Additional Fees and, Where Applicable, Protest Fee for PCT Application No. PCT/US2015/044285, dated Oct. 23, 2015.
Extended Search Report dated Jul. 12, 2018 for European Application No. 18172190.3, 8 pages.
"Meet the toughest, most durable rugged smartphones money can buy", Jan. 24, 20114, www.phonearea.com.
Amazon.com product listing, obtained online Jun. 4, 2014.
International Search Report and Written Opinion for PCT/US2015/018125, dated Jul. 1, 2015.
"V-Mount NiMH Battery Range," Cine Power International Ltd., Magnolia Lake, Mamhead, NR. Exeter Devon, EX6 8HG, United Kingdom.

* cited by examiner

MULTI-LAYER HANDHELD ELECTRONIC DEVICE

CROSS REFERENCE TO RELATED APPLICATIONS

This application is a Continuation of U.S. patent application Ser. No. 14/821,637 filed Aug. 7, 2015, which is a Continuation-in-Part of U.S. patent application Ser. No. 14/247,160 filed Apr. 7, 2014, which claims the priority benefit under 35 U.S.C. § 119(e) of U.S. Provisional Application No. 61/947,889, filed Mar. 4, 2014. This application also claims priority to U.S. Provisional Application No. 62/034,446, filed Aug. 7, 2014. The entireties of each of the foregoing applications are hereby incorporated by reference herein.

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

The capability of handheld electronic devices continues to advance. For instance, cellphones have increased in capability and have now evolved into so-called smartphones. These mobile phones are built on a mobile computing platform, with more advanced computing ability and connectivity than a typical cellular phone. The first smartphones were devices that mainly combined the functions of a personal digital assistant (PDA) and a mobile phone or camera. Modern models of mobile phones and other handheld electronic devices incorporate the functions of portable media players, digital still and motion video cameras, GPS navigation units and additional electronic capabilities.

Today's smartphones typically also include high-resolution touchscreens, web browsers that can access and properly display standard web pages, and high-speed data access via Wi-Fi and mobile broadband links. Application programming interfaces (APIs) on smartphones allow third-party applications to better integrate with the phone's operating system and hardware, while cellphones more commonly run on proprietary firmware. A variety of operating systems power conventional smartphones, including Android™, iOS™ and Windows® Phone (Android™ is a trademark of Google Inc., iOS™ is a trademark of Cisco Systems used under license by Apple Inc., and Windows® is a trademark of Microsoft Corporation). The confluence of consumer electronic devices and capabilities continues. Such capabilities can also be found on tablets and other handheld devices not equipped with phone capability.

Despite the significant advances in hand held electronic devices, the physical form of these devices has seen little evolution. Most are shaped like a more or less smooth brick with increasingly smooth front, back and side surfaces. This configuration can easily slip from the hand of the user, and risk damaging the phone with potential loss of valuable data as well as hardware. Some aftermarket removable covers have been proposed, but such covers add bulk and weight and otherwise fail to provide an elegant solution.

SUMMARY

Some of the inventions disclosed herein provide a housing for a handheld mobile electronic device such as a cellphone, having a modified surface with ridges or contours to enhance traction and resist slipping of the housing in a user's hand.

In accordance with one aspect of at least one of inventions disclosed herein, there is provided a handheld electronic device such as a cellphone having enhanced grip surface structures. The electronic device includes a body, having a left side, a right side, a front surface with a display and a rear surface. At least one of the right side and left side is provided with enhanced gripped surface structures comprising at least two laterally projecting extensions defining a concavity therebetween.

Enhanced grip surface structures may be provided on both the left side and right side of the body. At least two concavities may be provided on each of the left side and right side of the body. In some implementations, the projections are integrally attached to the electronic device body. A first number of concavities may be provided on the left side, and a second, different number of concavities may be provided on the right side.

At least one concavity has a depth of at least about 2 mm and/or a width of at least about 0.5 inches.

In some implementations, at least one concavity defines an inwardly extending contour on the rear surface but not on the front surface. Further, in some implementations, the inwardly extending contour extends on the rear surface and on one of the right and left sides, but not on the front surface.

There is provided in accordance with another aspect of at least one of the inventions disclosed herein, a method of manufacturing a handheld electronic device housing, such as a cellphone housing or digital camera housing. The method comprises the steps of manufacturing a housing having a left side, a right side, and front facing and rear facing surfaces. At least one of the left side and right side include at least two laterally extending projections defining a concavity therebetween, such that the at least two laterally extending projections defining the concavity therebetween remain exposed on the lateral sides of the electronic device following final assembly of the electronic device to provide an electronic device with enhanced grip surface structures.

The enhanced grip surface structures may be provided on both the left side and the right side of the body, and may comprise at least two concavities on each of the left side and right side of the body.

The projections may be manufactured by a machining process, a molding process, or by stamping, coining, bending, or other deformation process. The projections can be formed by depressing at least two regions of a surface to leave a projection therebetween. Alternatively, the projections may be provided as a separate component, and mounted on the housing.

The manufacturing method can include providing a first number of concavities on the left side, and a second, different number of concavities on the right side.

The method can include forming the concavity to have a depth of at least about 2 mm and/or forming the concavity to have a width at least about 0.5 inches.

Another aspect of a least one of the inventions disclosed herein includes the realization that power requirements for photographic lighting has dropped sufficiently in recent years, due in part to the widespread availability of small and low-power LED lights, that better lighting solutions can be applied to personal electronic devices, such as smartphones or cellphones. For example, those in the art of recognized that the low-power photographic lighting solutions, commonly referred to as a "camera flash", typically included on smartphones and cell phones, do not provide photographically optimal lighting for all photographic applications. For example, the typical, single point of light type flash device on presently available cellphones and other handheld electronic devices can create high contrast shadows with sharp edges that can be undesirable for some applications.

Thus, in accordance with some embodiments, a handheld mobile electronic device such as a cellphone can include a photographic lighting device, integrated there with, wherein the photographic lighting device includes at least a plurality of light sources relative to a camera lens of the cell phone or other device. For example, in some embodiments, the lighting device can extend around a periphery of the camera lens. Optionally, in some embodiments, the lighting device can extend around the periphery of another portion of the handheld electronic device, adjacent to the camera lens. The lighting device can be powered directly by the power source used for powering the handheld electronic device. As such, the cell phone can benefit from enhanced photographic lighting without the need for additional power supplies for powering the lights.

In accordance with another aspect of at least one of the inventions disclosed herein there is provided a handheld electronic device with enhanced photographic lighting. The electronic device includes a body having at least one outer surface. The electronic device includes a lighting device, which in some implementations comprises at least a plurality of light emitting devices spaced from the camera lens and spaced from each other.

The lighting device in some embodiments extends around a periphery of the camera lens. In some embodiments, the lighting device extends around a periphery of the body.

In accordance with yet another aspect of at least one of inventions disclosed herein, a handheld electronic device such as a cellphone with enhanced grip surface structures is provided. The electronic device includes a body having a left side, a right side, a top, a bottom, a front surface with a display and a rear surface. The right side and left side are provided with enhanced grip surface structures which can comprise at least two extensions projecting to the left and at least two extensions projecting to the right defining a left facing concavity and a right facing concavity. The concavities can have a best fit radius of curvature within the range of from about 1.0 to about 2.0 inches, and can positioned within the top half of the body.

At least two concavities can be included on each of the left and right sides, which can be symmetrically spaced along the length of the body. The projections are integral parts of the body in some implementations. Smooth outer side walls can be included along the bottom half of the body.

In various implementations the concavities have a depth of at least about 0.0625 inches and/or a width at least about 1.0 inches.

Depending on the embodiment, any of the handheld electronic devices described above, and more generally speaking, any of the devices described throughout the disclosure, can be a cellphone, or can instead be a different type of handheld electronic device such as a tablet or digital camera. For instance, depending on the embodiment the handheld electronic device may include any combination of one or more of the following, without limitation: a digital camera capable of still and/or motion photography, telephone capability (e.g., microphone, speaker, and appropriate hardware and software), a viewing screen, a user interface such as a touch screen that can also be the viewing screen, wireless capability (e.g., a wireless local area network [WLAN] interface), and web browsing capability.

Further features and advantages of the present inventions will become apparent from the detailed description of preferred embodiments which follows when considered together the attached drawings and claims.

BRIEF DESCRIPTION OF THE DRAWINGS

FIG. 7I is an exploded side schematic view of an example of a multi-plate electronic device.

DETAILED DESCRIPTION

Figure 1:
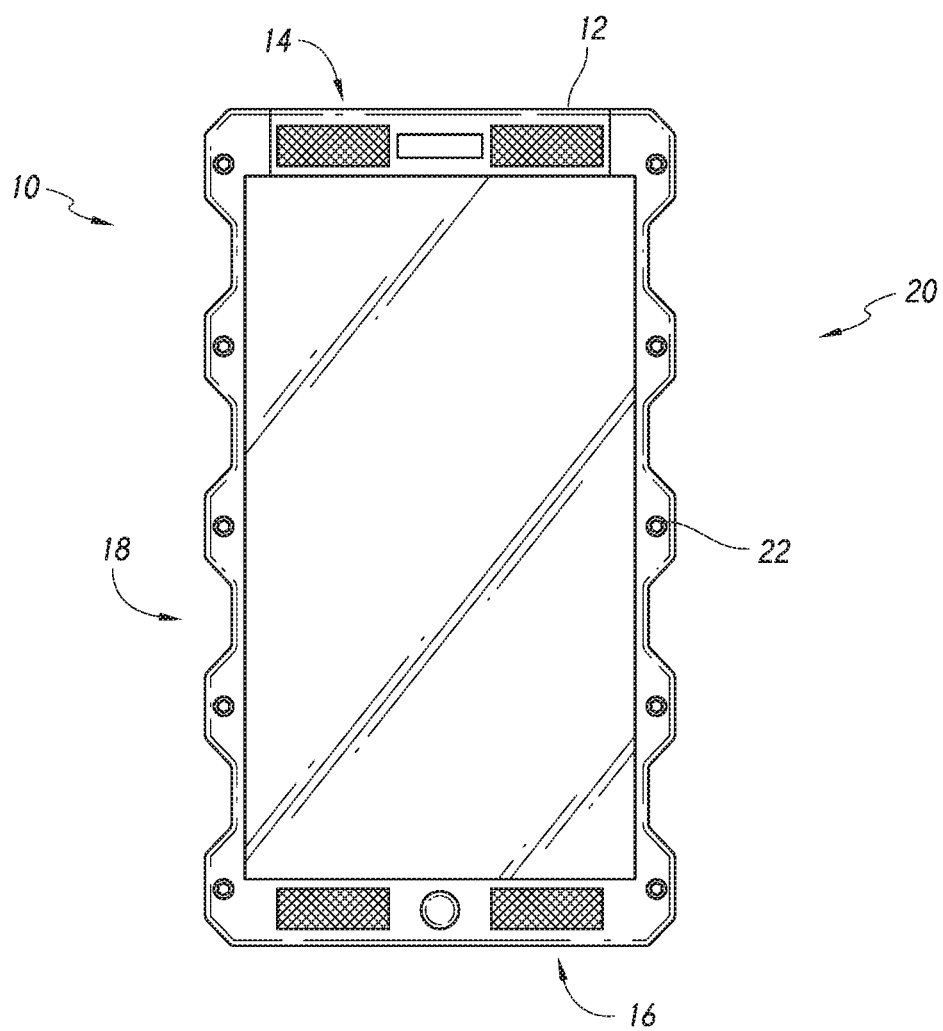
FIG. 1 is a front elevational view of a hand-held cellphone in accordance with one embodiment.

Referring to FIG. 1, there is illustrated a hand-held electronic device such as a cellphone 10. Although described herein primarily in the context of a cellphone, the inventions herein are applicable to any of a variety of handheld electronic devices with or without cellphone functionality, including digital still and motion cameras, personal navigation devices, mobile internet devices, handheld game consoles, or devices having any or a combination of the functions discussed in connection with FIG. 9, below.

The cellphone or other handheld electronic device can include a housing 12, having a top edge 14 and a bottom edge 16. Viewing the phone in its normal use orientation, cellphone 10 includes a left side 18, a right side 20 and a display 22. Display 22 displays a variety of applications, functions and information as is understood in the art. Display 22 may also incorporate touch screen control features as is understood in the art.

Dimensions of the housing 12 can vary considerably, depending upon the manufacturer and functionality of the phone. For example, the HTC smart phone is approximately 104 mm high by 55 mm wide by 12.8 mm thick. The Samsung Galaxy S5 is about 142 mm in height, 72.5 mm wide and 8.1 mm thick. The LG G2 is about 138.5 mm high, by 70.9 mm wide by 8.9 mm thick. The Apple iPhone S5 is approximately 123.8 mm high by 58.6 mm wide by 7.6 mm thick. Cell phones and handheld other electronic devices incorporating any of the inventions disclosed herein may fall within the range of the minimum to maximum recited above, or above or below that range, as desired. In all of the foregoing commercial products, the left side 18 and right side 20 are essentially perfectly linear. In contrast, at least one of the left side 18 and right side 20 of the cellphone or other electronic device in accordance with an aspect of at least one of the inventions disclosed herein are provided with regular, undulating contoured surfaces to facilitate grip.

The contoured surfaces or edges can comprise interference fit or friction enhancing surface structures or configurations to facilitate gripping the device with reduced chance of slipping and dropping. They can be provided in a variety of forms including some discussed below. In general, the surface structures are preferably permanently attached to the cell phone housing, as distinct from removable cell phone protective cases such as are available in the aftermarket. The enhanced gripping surface can be integrally formed with the housing, such as by machining, injection molding or other operations. The surface may alternatively be applied at the point of manufacture or assembly, such as by overmolding, adhesively bonding or attaching by any of a variety of techniques such as with screws or other fasteners, or by soldering, welding, brazing, press fit interference interlocking structures or other attachment technique known in the art. The enhanced gripping surface is preferably not removable by the user in the course of ordinary intended use, and removal by the consumer would require destructive acts or would void the warranty of the device. The contoured surfaces are thus, in some embodiments, preferably a part of the native housing of the cell phone or other hand held electronic device.

The terms concavity and projection as used herein are convenience terms to refer to deviations from planar in a lateral direction such that a laterally outwardly facing concavity is defined between two projections extending laterally in the same direction to define the sides of the concavity. The terms concavity and projection are thus used in a relative spatial sense and do not convey the manner in which they were formed unless otherwise specified. In general, a projection to the right may be formed by adding material to the native right side surface of a substrate, or by removing material from the native right side surface of the substrate on either side of a region which has now become a projection, or by indenting a left side of a substrate to form a corresponding right facing projection, or by bending a substrate such as into a zigzag configuration to produce a plurality of laterally facing projections and concavities.

The laterally extending structures may thus be projections in a conventional sense formed such as by the addition or attachment of projections to a starting surface to build it out, but also include two native portions of a starting component between which a recess or indentation has been formed thereby resulting in the native surface forming a relative projection as a result of the recesses on either side. Thus any of a variety of manufacturing techniques may be utilized to provide the projections and recesses of the non-smooth lateral sides of the cell phone body in accordance with one or more aspects of the inventions disclosed herein, depending upon the materials and desired manufacturing techniques. The projections may be formed by injection molding or other molding techniques, particularly in the case of a polymeric housing. Projections may be formed by stamping, coining, or other compression or bending steps to provide an impression on a first side of a substrate and a corresponding projection on the opposing side of the substrate. The substrate in this instance may be in the form of a strip (e.g., stainless steel, titanium, aluminum or other metal) of material that will subsequently be attached to a frame to form the lateral surfaces of the housing. Projections may alternatively be formed by attachment of a separate component to a substrate, such as by adhesively bonding, soldering, brazing, welding or other bonding technique, or by mechanical interfit such as interference fit structures or through the use of fasteners such as screws, rivets or press fit constructs. Projections (and the corresponding intervening concavities) may alternatively be formed by removal of material from a substrate to form the concavity such as by grinding, milling, EDM, laser etching or other machining or removal technique as will be understood by those of skill in the art in view of the disclosure herein.

Figure 2:
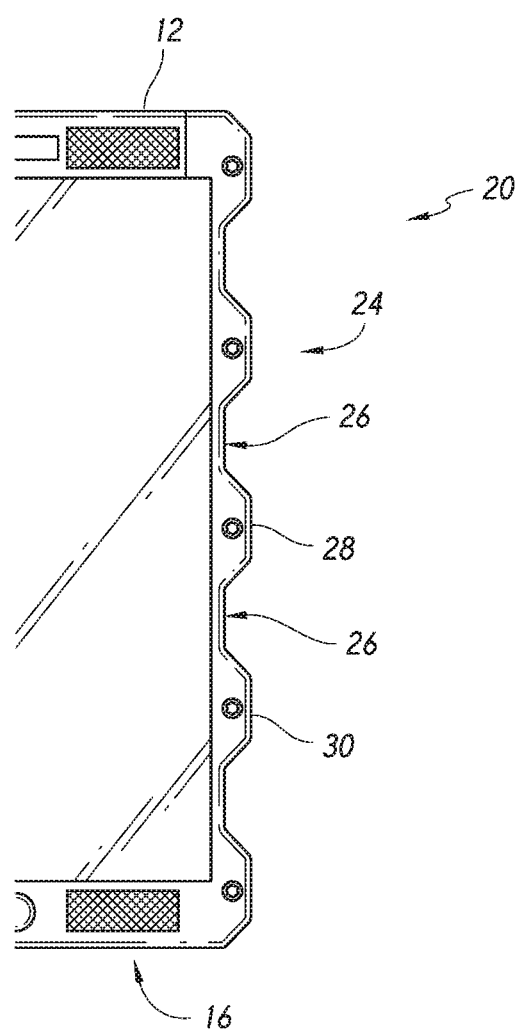
FIG. 2 is an enlarged schematic view of a right edge of the cellphone of FIG. 1.

Referring to FIG. 2, there is illustrated a schematic enlargement of the right side 20 of the housing 12. The left side may or may not be a mirror image of the right side. Right side 20 is provided with a contoured wall 24 having at least one concavity 26 positioned between a first projection 28 and a second projection 30. At least one concavity 26, and generally at least about 2, 3, 4, 5 or more may be provided on right side 20. In the embodiment illustrated in FIG. 1, four concavities 26 are illustrated.

Figure 3:
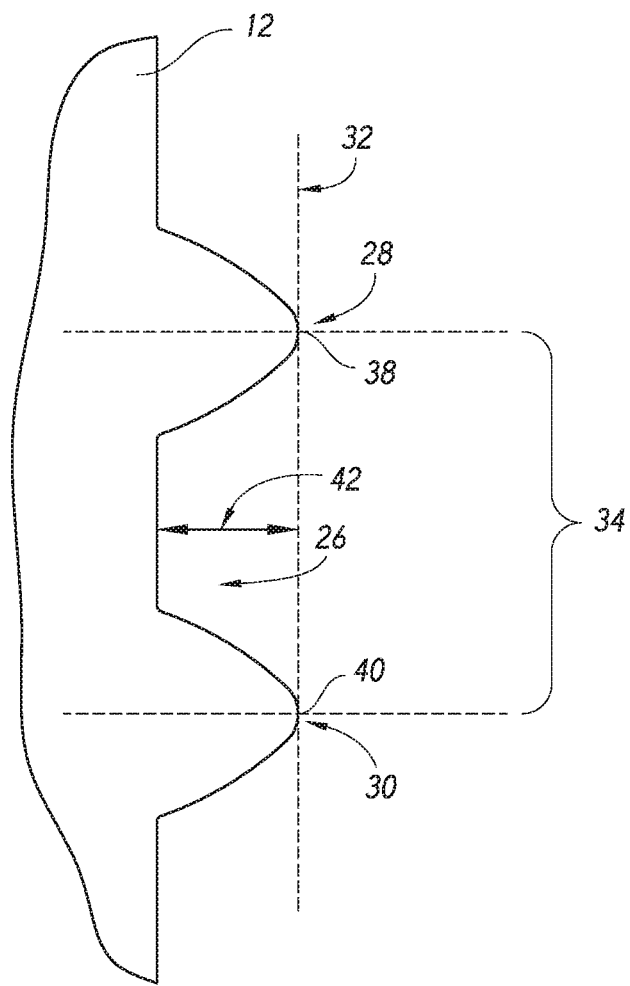
FIG. 3 is an enlarged schematic view of a single concavity of a cellphone housing in accordance with embodiments.

Additional details of a single concavity 26 may be seen in connection with FIG. 3. An outer boundary 32 is an imaginary line which contacts the apex of each of first projection 28 and second projection 30. In an embodiment where the projections comprise curved surfaces, the outer boundary 32 would describe a tangent with respect to the first projection 28 and second projection 30. The width 34 of the concavity 26 may be measured between the tangent contact point 38 and 40 in the implementation illustrated in FIG. 3. In an embodiment in which the projection has a flat surface, such as that illustrated in FIG. 1, the width 34 of the concavity will be measured between the points at which the wall of the concavity fall away from the outer boundary 32 in the direction of the center of the concavity.

The concavity may also be considered to have a depth 42, measured between the outer boundary 32 and the deepest point in the concavity 26.

The width 34 of the concavity will generally be at least about 2%, often at least about 4% or 6% and in some embodiments as much as 10% or more of the overall height of the housing 12 measured along the direction of outer boundary line 32. In some implementations, the width 34 may be at least about 30%, and in some implementations, at least about 50% of the height of the housing 12, depending upon the desired performance. In general, the width 34 of each concavity 26 will be at least about 0.25 inches, and often at least about 0.5 inches.

The depth 42 of the concavity 26, measured at its deepest point, will typically be in excess of about 1 mm, and often at least about 2 mm or 3 mm or more. In some embodiments, the depth 42 will be about 4 or 5 mm, or more.

Figure 4:
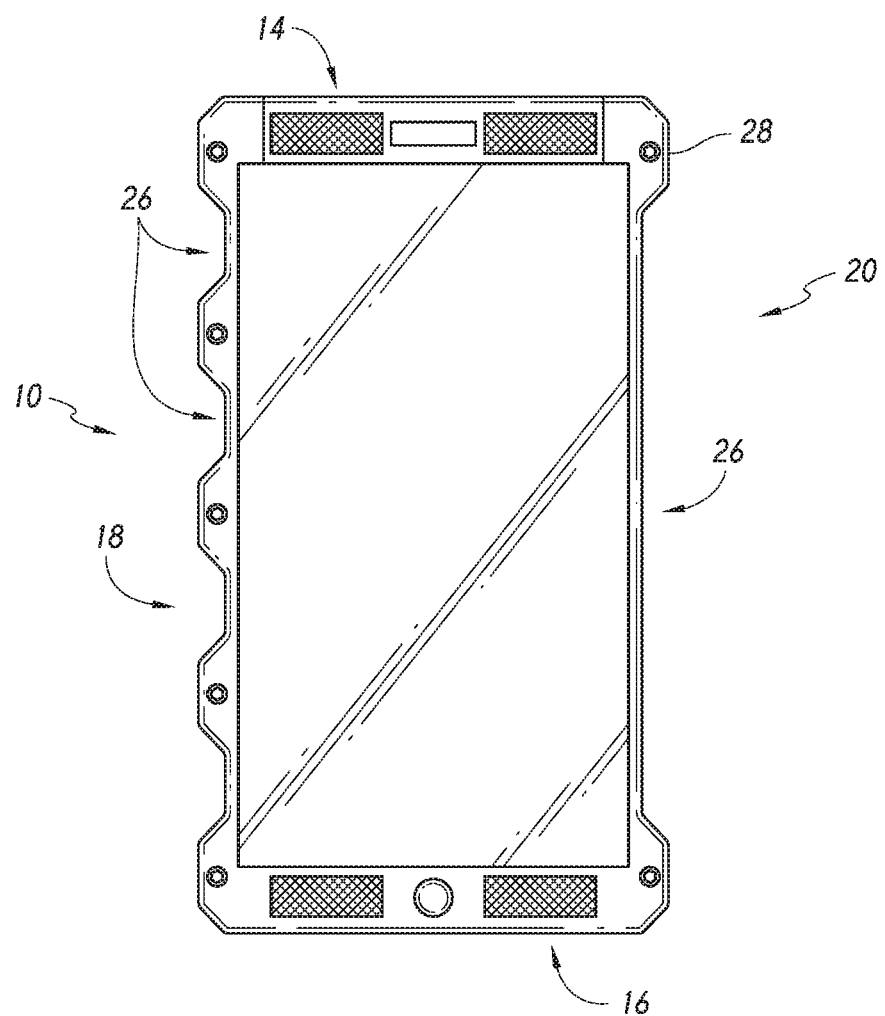
FIG. 4 is a front elevational view of a handheld cellphone as in FIG. 1, reconfigured with bilateral asymmetry for right hand operation.

The housing illustrated in FIG. 1 exhibits bilateral symmetry. However, asymmetrical configurations may be desirable as described below. Referring to FIG. 4, there is illustrated a cellphone housing as in FIG. 1 with a left side 18 and a right side 20. However, the left and right sides exhibit bilateral asymmetry by having fewer concavities 26 on the right side than are present on the left side 18. Mirror images of any of the asymmetrical configurations disclosed herein are also contemplated.

In the illustrated embodiment, a single right side concavity 26 is defined between a first projection 28 and a second projection 30. The single concavity 26 has a width 34 of at least about 30%, and in some implementations at least about 50%, at least about 75% or 85% or more of the overall height of the phone. This configuration might be considered to be a phone optimized for right hand operation. As is understood in the art, the anatomy of the hand includes a large rounded mound at the base of the thumb, known as the thenar°eminence. This is the result of a grouping of muscles dominated by the abductor pollicis bruvis. Providing a concavity 26 having a width of at least about 1 inch, and in some embodiments at least about 1½ inches or 2 inches or 2½ inches or more, provides a cradle for the thenar eminence whereas the multiple distinct concavities 26 on the left side 18 of the housing provide individual cradles for individual fingers. Although the concavity 26 is illustrated in FIG. 4 as bilaterally symmetrical about the mid-point of the height of the phone housing, the mid-point of the concavity 26 may be offset in an inferior direction, closer to the bottom edge 16 than the top edge 14. In this manner, the housing for the cellphone may more closely conform to the hand of the user, and the form factor of cellphones in accordance with one or more aspects of at least one of the inventions disclosed herein may take the form of a contoured grip that may be securely grasped by the user.

Figure 5:
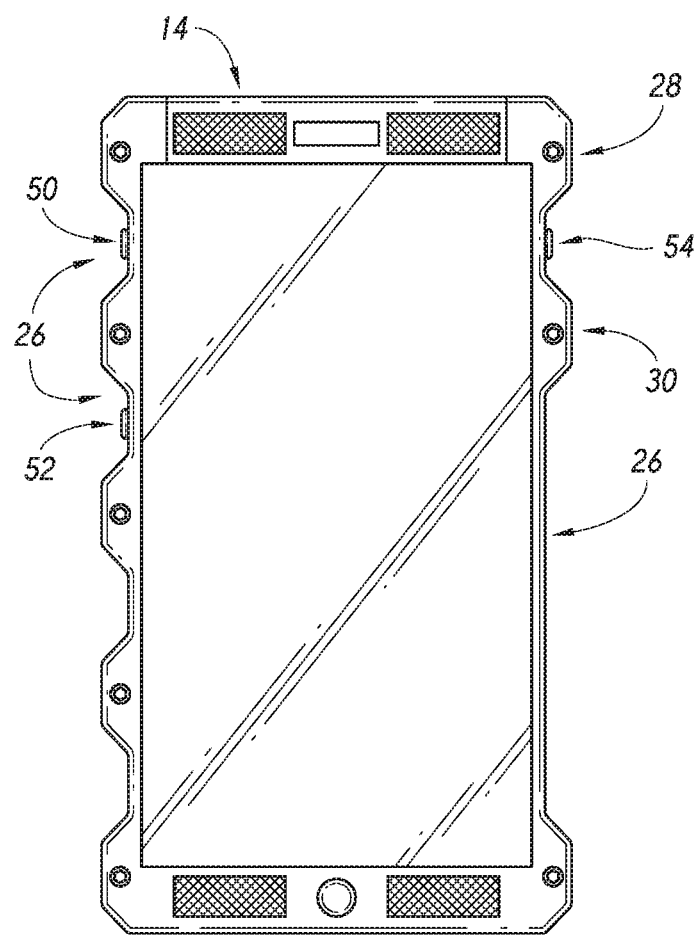
FIG. 5 is a front elevational view as in FIG. 4, with electronic controls positioned in selected concavities.

Referring to FIG. 5, it will be appreciated that embodiments of the concavities of the cellphone housing can provide a predictable landing point for each of the fingers when a user is grasping the cellphone. Thus, finger buttons to control various functions of the phone or other device may be located within one or more of the concavities 26. Buttons or other controls may be provided with an activation force threshold that is high enough that the cellphone may be grasped by the user under normal use conditions without activating the button. However, upon application of a greater compressive force than normally utilized to grasp the phone, the user can selectively activate the buttons as desired, to control various functions of the telephone.

Thus, referring to FIG. 5, a first concavity 26 may be provided with a user activated control such as a button 50, for activation by the index finger. In this instance, the illustrated cellphone is configured for operation by the user's right hand. A second concavity 26 may be provided with a second control 52 for activation by the user's middle finger. Additional buttons (not illustrated) may be provided for the user's ring finger, and baby finger.

In addition, a concavity 26 on the right side of the phone may be provided with a button or other control 54 for activation by the user's thumb. The thumb control 54 may be positioned within a concavity 26 defined between a first projection 28 and a second projection 30 that are less than about 2 inches, and preferable less than about 1 inch apart. A larger concavity 26 is provided as previously described to provide a cradle for the thenar eminence.

Figure 6:
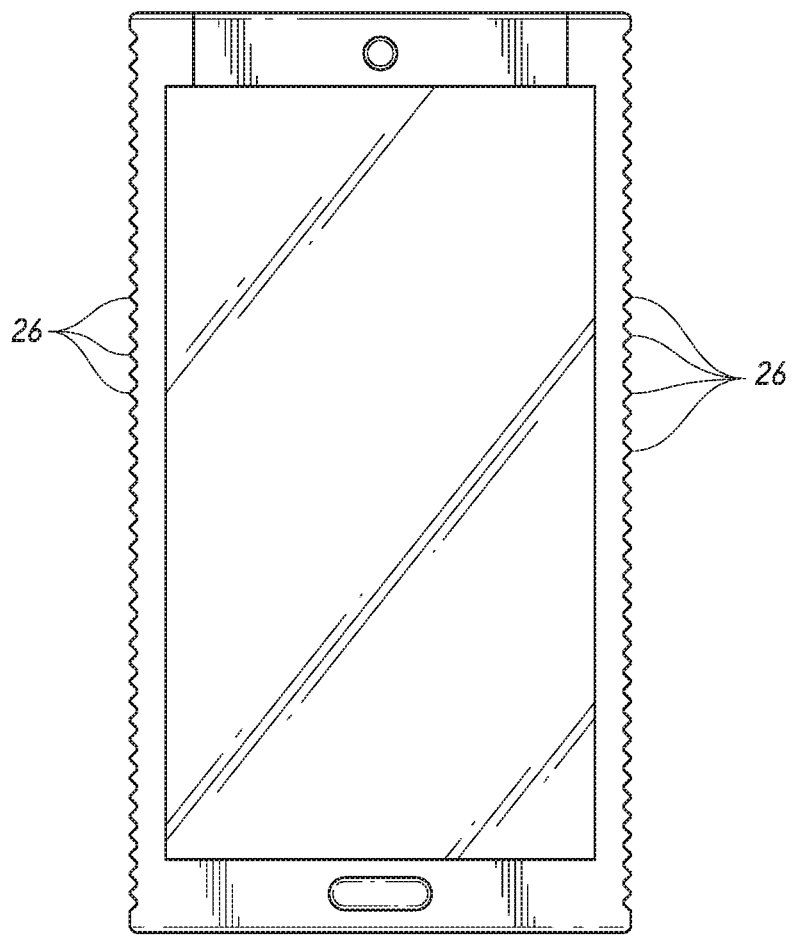
FIG. 6 is a front elevational view of an alternate handheld cellphone in accordance with embodiments having gripping surfaces with small contours.

Embodiments of the concavities 26 of relatively short width may begin to appear to have a corrugated or ridged surface, such as illustrated in FIG. 6. In this implementation, there may be at least about 5, at least about 10, and in some implementations at least about 15 or more concavities 26 per running inch of width along the side walls of the phone. An additional example of housing profile is illustrated in FIG. 7A, showing a plurality of concavities having substantially constant radius of curvature.

Figure 7A:
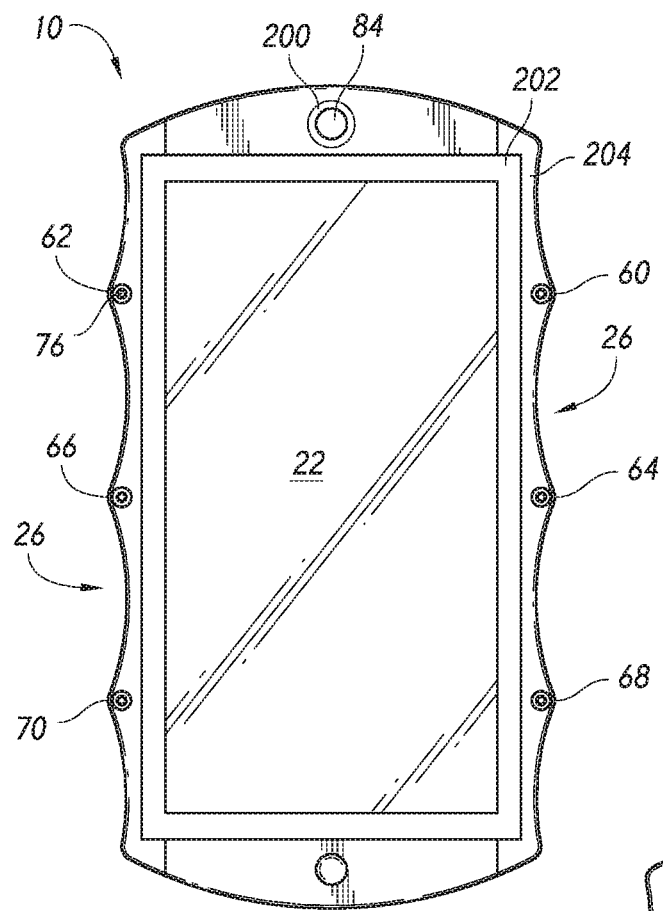
FIGS. 7A-7H are schematic views of alternate housing profiles in accordance with embodiments.
Figure 7B:
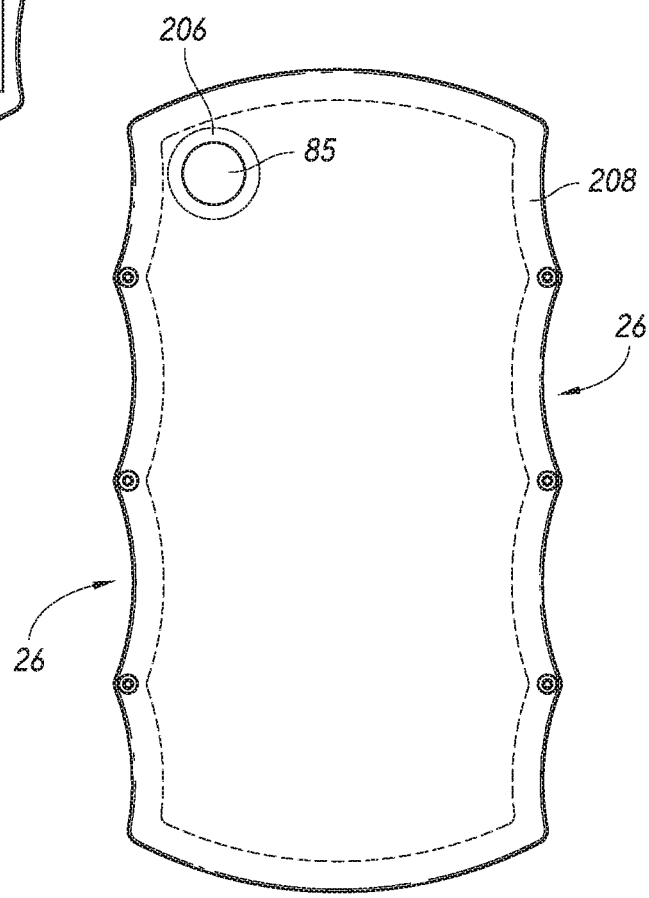
Figure 7C:
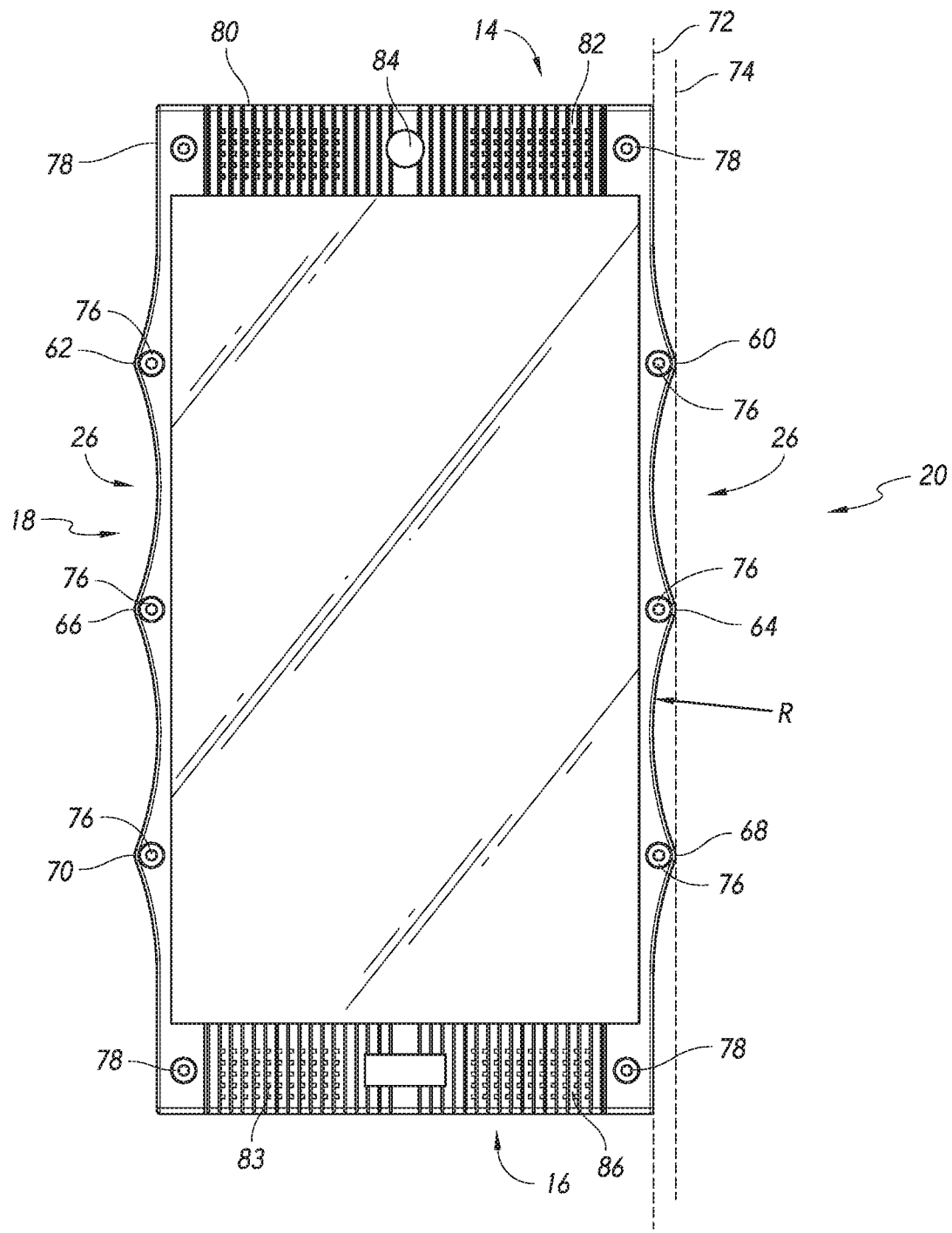

Referring to FIGS. 7A and 7C, there is illustrated a hand held device such as a cellular phone having a top edge 14, a bottom edge 16, a left side 18 and a right side 20. Each of the left side 18 and right side 20 are provided with a plurality of substantially uniform concavities or undulations, as are discussed in greater detail elsewhere herein. The illustrated embodiment exhibits bilateral symmetry, with a first left projection 62 disposed opposite a first right projection 60. Together, projection 62 and projection 60 define an opposing projection pair, oriented on a line which is transverse to the longitudinal axis of the phone. Preferably, the first projection pair is located on the top half of the phone, and generally will be within the top ⅓ or top 25% of the overall height of the phone. If no additional projections are provided, the resulting concavity below the projection will be "open ended" on the bottom.

A second right projection 64 may be provided, opposite a second left projection 66. Together, right projections 60 and 64 define the limits of a concavity 26 extending therebetween. Second right projection 64 and second left projection 66 together form a second projection pair, which in turn define a left and right concavity 26 positioned within the top half or top third of the phone. The apexes of second right projection 64 and second left projection 66 may define a line which is transverse to the longitudinal axis of the phone, and which may cross the longitudinal axis of the phone at a point within the range of from about ±30%, in some embodiments within the range of from about ±15%, and, in some embodiments within about ±5% of the overall length of the phone from the longitudinal midpoint of the phone.

In the illustrated embodiment, a third right projection 68 is disposed opposite a third left projection 70, to define a second pair of concavities 26. A fourth right and fourth left projection, and a fifth right and fifth left projection may be provided depending upon the desired functionality of the phone.

In the illustrated embodiment, the projection pairs are spaced symmetrically about the longitudinal centerline of the phone. In an embodiment having a longitudinal length of about 6.25 inches, the second right projection 64 and second left projection 66 lie on a line which crosses the midpoint of the phone at approximately 3.125 inches from the top edge 14 or lower edge 16. In this embodiment, each concavity 26 has a substantially constant radius of curvature, which is generally within the range of from about 0.5 inches to about 2.5 inches, often within the range of about 1.0 inches to about 2.0 inches, and, in one implementation, the radius is within the range of from about 1.3 inches to about 1.8 inches. The curvature of the surface within each concavity 26 may be substantially constant, such that the surface curve conforms substantially to a portion of a surface of a circle. Alternatively, the curvature of the concavity 26 may be noncircular, such as a surface which conforms to a portion of a surface of an ellipse or toroid. As used herein, radius refers to the radius of a constant radius curve, as well as the radius of a constant radius curve which has the best fit with the non-constant radius curvature of the concavity 26.

The arc length measured along the surface of the curve of concavity 26 from the apex of adjacent projections will generally be within the range of from about 0.5 inches to about 2.5 inches, often between about 1.0 inches and 2.0 inches, or within about 1.2 inches and about 1.8 inches.

A line 72 illustrates the width of the phone at the upper edge 14 and lower edge 16, measured in parallel to the longitudinal axis of the phone. Line 72 in the illustrated embodiment is a side of the best fit rectangle that encompasses the phone excluding the projections. Line 74 illustrates the outer most width boundary of the phone, drawn along a tangent from apex to apex of adjacent projections. Concavities 26 may thus represent an area of material which has been removed from the wall of the phone relative to the area of the best fit rectangle surrounding the perimeter of the phone.

The linear distance between reference line 72 and reference line 74 is generally at least about 0.050 inches, often at least about 0.0625 inches, and preferably at least about 0.125 inches.

The concavities 26 illustrated in FIG. 7B, or any of the alternative concavities disclosed herein may be spaced apart along the entire length of the phone. Alternatively, concavities may be constrained to within only the top 50%, alternative the top 35%, in some implementations the top 25% of the length of the phone. In some embodiments, the left and right projection may be positioned within about 25%, or within about 15% or 10% or less of the length of the phone, within the top edge of the phone. A second pair of left and right projections may be provided within a similar distance from the bottom edge of the phone. Alternatively, the second set of projections may be omitted.

A first plurality of screws or other fasteners 76 may be provided for connecting front and back plates of the phone together. At least 2 and preferably at least 4 or 6 fasteners 76 may conveniently be positioned along the right and left sides 20 and 18 within the projections, thus enabling the fasteners 76 to be carried "off board" so that the width of the viewing surface of the phone may be maximized relative to the overall mass of the phone.

A second set of fasteners 78 may be provided, with two fasteners located above the viewing screen and two fasteners located below the viewing screen. As such, they may be radially inset towards the midline of the phone without compromising the viewing screen. An upper left speaker 80 and upper right speaker 82 may be provided above the viewing screen, as well as a camera lens 84. A lower left speaker 83 and a lower right speaker 86 may be provided, as well as at least one microphone may be positioned on the phone, such as below the viewing screen.

Figure 7D:
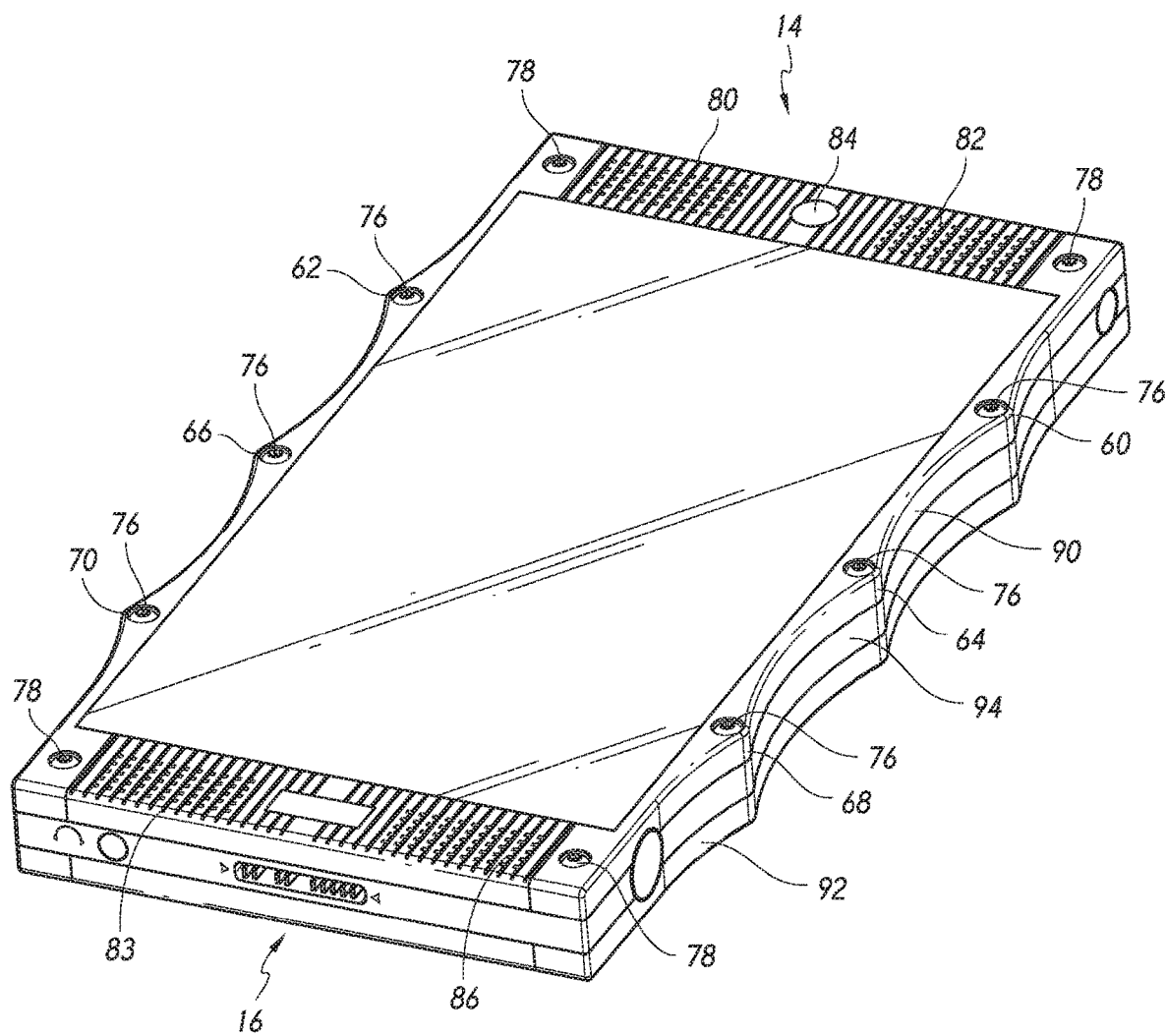

Referring to FIG. 7D, there is illustrated a perspective view of the embodiment shown in FIG. 7B. In the illustrated embodiment, a front plate 90 and a rear plate 92 are spaced apart by an intermediate frame 94 in a sandwich configuration, to enclose the electronics of the phone or other electronic device. A plurality of fasteners 76, 78 secure the front plate 90 and rear plate 92 together, to provide an enclosed electronics chamber.

Although the layered handheld electronic device housing is illustrated as including three layers 90, 92, 94, four or five or more layers may be included as desired. In addition, a gasket layer or adhesive layer may be included in between the front plate 90 and intermediate frame as well as or alternatively between the intermediate frame and the rear plate 94.

The sandwich configuration of the housing along with exposed screws enables a variety of advantages. For example, screws extending between a front plate and rear plate, whether exposed or not, enable positive compression in the front to back direction. This may be accomplished using any of a variety of fasteners, such as screws, rivets, or other compression fasteners. This enables tight compression such as for waterproofing or other seal against environmental elements.

In addition, exposed fasteners 76, 78 such as conventional bolts or screws enables removal and replacement of either the front plate, rear plate, or any intermediate frame. For example, if a conventional cellphone or other handheld device including a display screen is dropped, e.g., such that the front window shatters, the entire device is normally discarded and replaced. In accordance with certain embodiments described herein, replacement component parts may be provided. Thus, a shattered front viewing window may simply be removed and replaced without discarding the device, or via straightforward replacement with the fasteners 76, 78. For instance, a new front plate may include a display screen. An end-user may be able to install a new front plate, for example, without needing to resort to a specialist to perform the install.

Front, rear or intermediate plates or frames may additionally be removed and replaced, post assembly, or assembled at the point of manufacture in various combinations for aesthetic or functional reasons. Any of these plates may be provided in an array of different colors, textures, or materials, such that the purchaser of the phone or other electronic device can purchase phones having alternative component combinations and have the device made with or make post manufacturing upgrades or other substitutions with the detachable component phone housing.

In addition, improved methods of manufacturing and inventory management are provided according to other embodiments. An array of interchangeable plates may be maintained in inventory, and assembled to the electronic component in accordance with consumer demand. Thus, electronic components would not be idled because they are contained within a housing that may be less commercially desired than other housings.

The front to back fasteners such as a screw additionally enables a more robust attachment and construction for the phone. This attachment technique can support thicker and/or stronger front and/or back plates. This may be desirable, if, for example, the rear plate will be called upon to support other external attachments. External attachments could include a mounting arm or mounting base, for use in an environment where the phone is desirably supported from a tabletop of other structure. In an alternate embodiment, the rear plate may be called upon to support a lens mount, such as for connection to any of a variety of varying size external lenses.

The detachable component aspect additionally facilitates the exchange of options, depending upon buyer preference. For example, a standard rear plate may be removed and replaced by a rear plate which contains or encloses an enlarged battery for extended use. A rear plate incorporating or enclosing an expanded memory capacity may also be desirable for some users, particularly for users who may generate large volumes of data such as by video recording.

In one implementation of the inventions disclosed herein, one fastener such as a screw may be omitted or a separate aperture formed leaving an aperture from the front face to the rear face of the phone or through a projection of any of the layers. This may be accomplished, for example, in an upper right or upper left corner aperture, or other around the periphery of the phone. Due to the compression generated by the remaining fasteners, and the robust nature of the front plate and rear plate, this may be accomplished without compromising the integrity of the phone. The available aperture may then be utilized to secure a bungee or other tether, as a safety device for phones that will be carried by a buyer into active environments where the phone may become separated from its case, or otherwise released in a manner that it may become lost or damaged. Bungees may be provided having a first end attached to the phone and a second end with an attachment structure such as a clip which may be attached to a button, belt loop, other portion of a wearer's clothing or an available structure depending upon the intended use environment.

In one implementation, a basic rear first plate 92 (FIG. 7D) is a substantially planar opaque surface having relatively few functional components. Functional components could include one or more internal camera lenses, and various lights and/or sensors associated with the camera function. This standard plate may be either removed by the buyer or a substitution made at the point of manufacture, to include a second different rear plate. The second plate contains an optical component support including a lens mount (e.g., the inverted positive lock support 220 shown in FIGS. 8A-8B, or support including any of the mount types described below), enabling the mounting of conventional external photography lenses or lens mount adapters to the back plate.

Due to the non-standardization of lens mounts among the various lens manufacturers, rear lens mount plates may be manufactured having a unique lens mount configuration corresponding to various lens types. A buyer can therefore identify a desired lens system, and either purchase or construct a cellphone having a rear plate which contains a lens mount appropriate for the desired system. At the present time, rear lens mount plates are contemplated having any of a variety of lens mount configurations, such as those configured to adapt to any of the following lens mounts: Pentax Q-mount; D-mount (8 mm movie cameras); CS-mount (surveillance cameras); Nikon 1-mount; C-mount (Bolex, Eclair and Bell & Howell); Fujifilm X-mount; Canon EF-M-mount; Sony E-mount; Sony FZ-mount; Micro Four Thirds System; Samsung NX-mount; RED ONE interchangeable mount; Leica M-mount; M39 (Leica) Screwmount; Olympus PEN F; Contax G-mount; Contax RF-mount; Nikon S-mount; Olympus Four Thirds System; Konica AR-mount; Canon FL-mount; Canon FD-mount; Start (Soviet SLR) Minolta SR-mount; Fujica X-mount; Canon EF mount; Canon EF-S-mount; Praktica B-mount; Signa SA-mount; Minolta/Konica Minolta/Sony A-mount; Pentax K-mount; M42; Contax C/Y-mount; Olympus OM-mount Nikon F-mount; Leica R-Complementary mount; Sony B4-mount; Contax N-mount; Arri STD; Arri B; Arri PL; T-mount; Panavision PV-mount; OCT-19; Mamiya 645; Contax 645; Pentax 645; Hasselblad 2000 & 500; Pentax 6x7. Lenses having any of the foregoing mounts may be directly mountable to a complementary mount on a lens mount adapter which mounts to the rear plate, or directly to a unique rear plate configured for each specific lens mount type.

An example of a support/lens mount 220 having an inverted positive lock lens mounting system, and that can be included on a rear plate of any of the embodiments described herein, is described below with respect to FIGS. 8A-8B.

FIG. 7I shows a side view of an example of a multi-plate handheld electronic device 300. The illustrated device 300 includes three plates, which comprise a front plate 302, an intermediate plate 304, and a rear plate 306, although 2, 4 or more plates can be provided depending on the embodiment, as described.

The plates can be fastened together with one or more screws or other fasteners 308, such as to create compression between the plates 302, 304, 306. Any number of fasteners can be used such as in accordance with any of the embodiments described herein. For instance, 2, 3, 4, 5, 6 or more fasteners can be used. As shown, the fasteners 308 extend from an exposed surface 310 of the front plate 302 through any intermediate plate 304 to an exposed surface 312 of the rear plate 306. The fasteners 308 can be threadably or otherwise inserted into one or more pass-through holes 313 in the plates to fasten the plates together.

The illustrated front plate 302 can include a display screen 315 provided on an exposed surface 310. The front plate 302 can include one or more connectors 314 on the side opposite the exposed surface 310, and configured to mate with one or more corresponding connectors 316 carried on a front side of the intermediate plate 304, facilitating electrical communication between the front plate 302 and some or all of the subsequent plates 304, 306. The connectors 314, 316 can mate via a friction fit or other appropriate mechanism, and can allow for straightforward pluggable electrical connection between plates. The front plate 302 may include all of the electronics necessary to drive the display screen 315 in some embodiments. In other implementations, another plate, such as the intermediate plate 304 or the rear plate 306 include some such electronics, and the connectors 314, 316 allow signals for driving the display screen 315 to be communicated to the front plate 302 from electronics within a subsequent plate.

The illustrated intermediate plate 304 includes at least one connector 318 on its rear side that is configured to mate with a corresponding connector 320 provided on a un-exposed side of the rear plate 306. The exposed surface 312 of the rear plate 306 can include an optical component 322, such as a lens. A second rear plate having a different lens can optionally be included, allowing a user to change lenses by swapping out the rear plate 306 for the second rear plate. Or, as described herein, the optical component 322 can be a lens mount. The lens mount can have an interface of a first mount system type, allowing for attachment of lenses having a corresponding interface of the first mount system type. At least one additional rear plate (not shown) can be provided for selective replacement of the rear plate 306, where the additional rear plate(s) include an interface of a second mounting type, allowing for attachment of lenses having a corresponding interface of the second mount system type.

The device 300 can include a camera, which comprises the optical component 322. The rear plate 306 can include some or all of the electronics of the camera, including an image sensor and/or memory, for example. In such embodiments, a second rear plate including different electronics (e.g., a different resolution image sensor) can be swapped in to upgrade or otherwise replace the electronics of the first rear plate 306. In other embodiments, at least some of the camera electronics are included in another plate, such as the intermediate plate 304 or the front plate 302. In such embodiments, the connection between the connectors 318, 320 of the intermediate plate 304 and the rear plate 306 can allow electrical signals to be communicated between the electronics within the intermediate plate 304 and the rear plate 306, such as to operate the optical element 322 and/or any other camera electronics within the rear plate 306. Similar to the connectors 314, 316 of the front and intermediate plates 302, 304, the connectors 318, 320 can mate via a friction fit or other appropriate mechanism, and can allow for straightforward pluggable electrical connection between the intermediate and rear plates 304, 306. In this manner, the combination of the mechanical compression fasteners 308 and pluggable electrical connectors 314, 316, 318, 320 allows for both robust constructions and straightforward swapping of customized plates for aesthetic, upgrade, or other purposes. The male and female orientation of any of the connectors 314, 316, 318, 320 can be reversed in other embodiments.

Figure 8A:
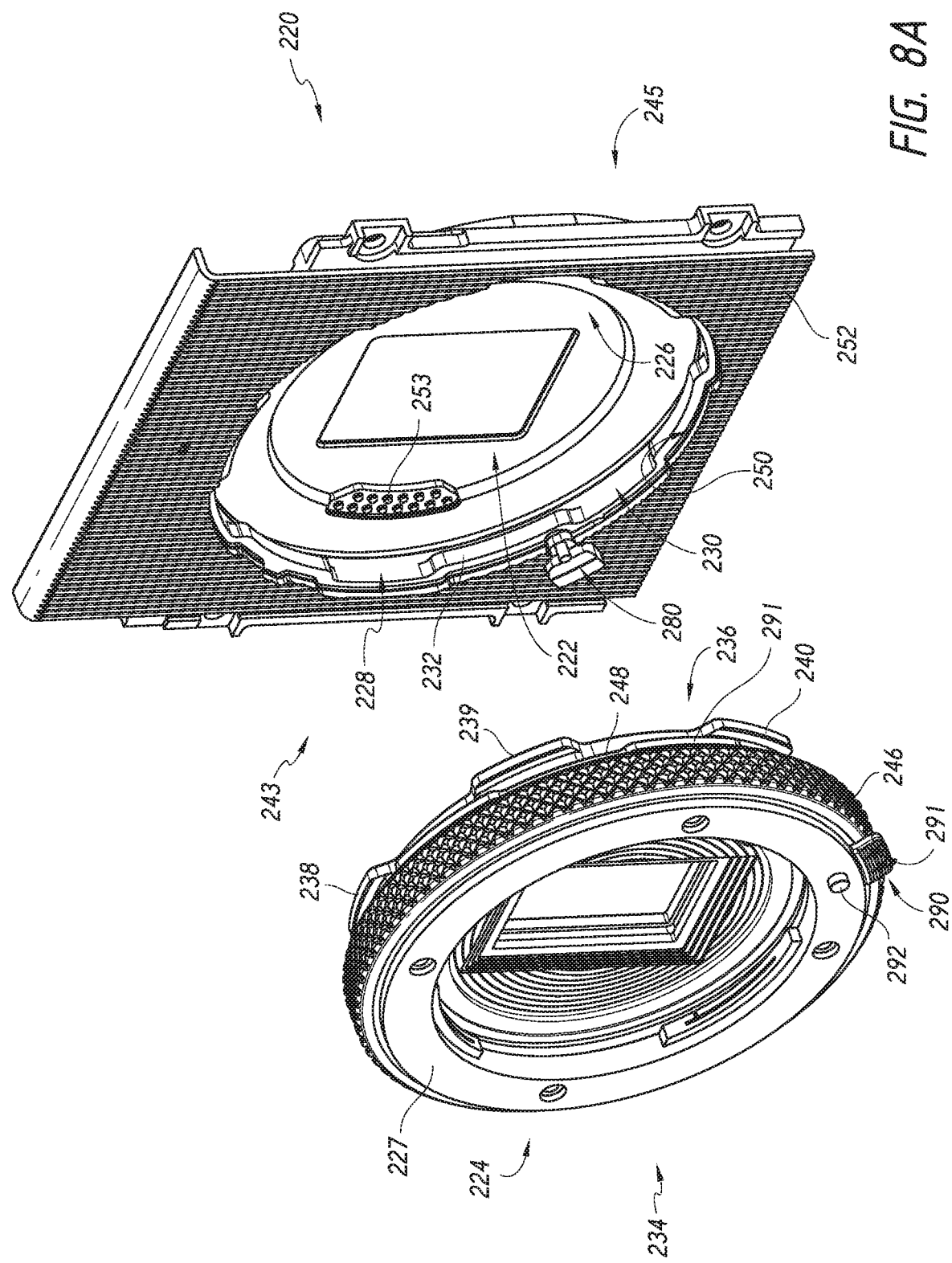
FIG. 8A is a perspective exploded view of examples of an optical component support that can be incorporated into a handheld electronic device according to certain embodiments.
Figure 8B:
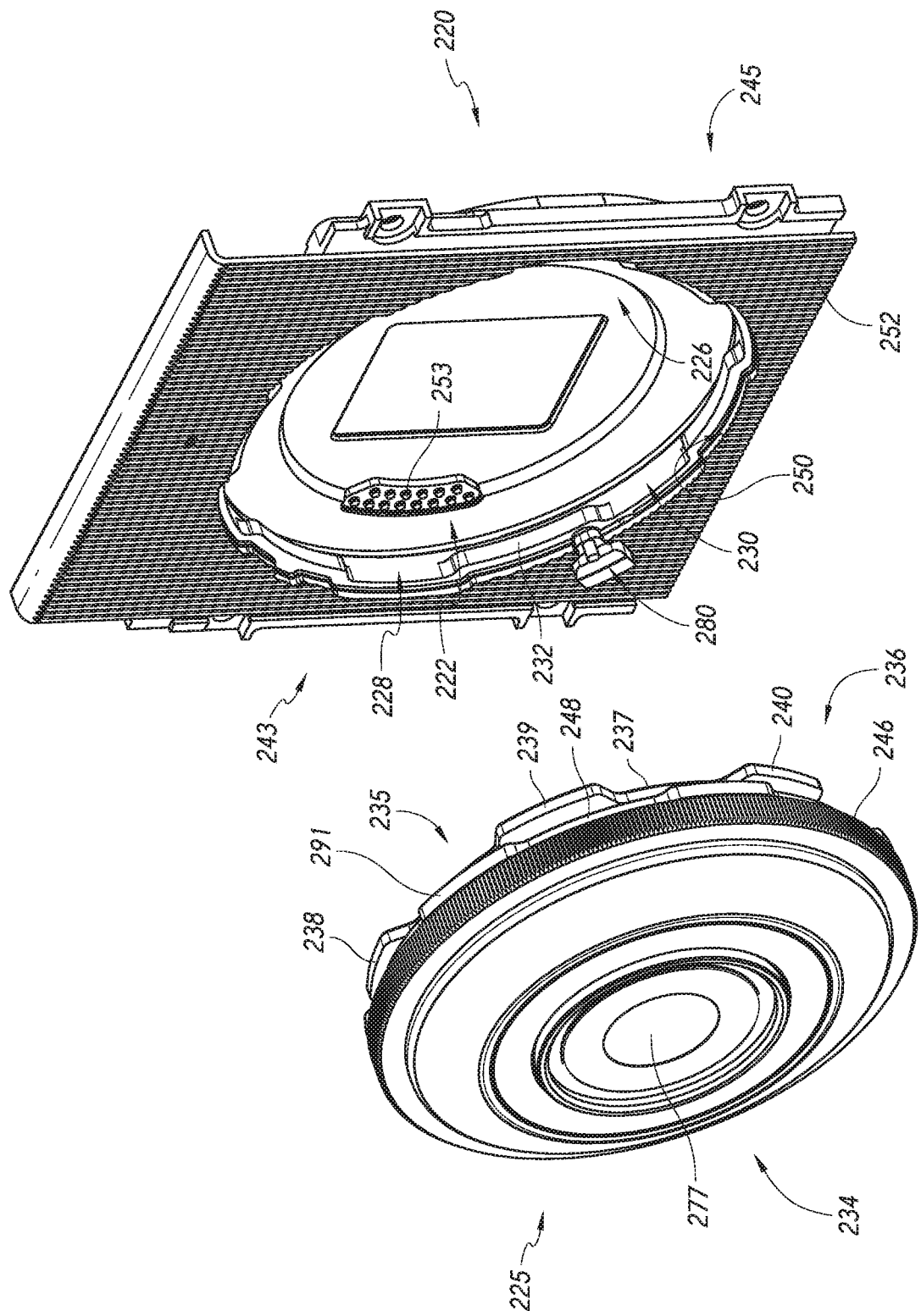
FIG. 8B is a perspective exploded view of examples of an optical component support that can be incorporated into a handheld electronic device according to certain embodiments.

One type of support/lens mount 220 that may be incorporated with the cellphone, camera, or other electronic device of any of the embodiments described herein is illustrated in FIG. 8A. The support 220 forms a female portion of an inverted positive lock mounting system, embodiments of which are described in U.S. application Ser. No. 14/820,439, titled "Low-Profile Lens Mount", filed on Aug. 6, 2015 and U.S. application Ser. No. 14/821,631, titled "Low-Profile Lens Mount", filed on Aug. 7, 2015, the entire contents of both of which are incorporated by reference herein. For instance, the support 220 may be provided on a back plate of any of the handheld electronic devices herein. In FIG. 8A, a lens mount adapter 224 is shown. A camera side 236 of the adapter 224 includes a male portion of the inverted positive lock mount system, for connecting to the support 220, via aligned insertion and subsequent rotation of the adapter 224 into the aperture 222. On a lens side 234 of the adapter 224, a lens mount interface is provided for connecting to a lens having a different mount type, which can include any of the lens mount types described herein (e.g. Sony E-mount, Micro 4/3 [MFT], etc.). FIG. 8B shows the support 220 in conjunction with a lens 225, which implements a male portion of the positive lock mount system. Although other types of supports 220 can be implemented on the handheld electronic device plates, the inverted positive lock mounting mechanism enables a low stack height of a conventional bayonet type mounting system, yet provides the high clamping strength of a PL (positive lock) mount. Such mounts also enables a very shallow back focus, or flange focal distance.

Preferably, the camera includes a capability for capturing still images with various and/or adjustable resolutions and aspect ratios for example but without limitation, as high as 6144×3160 pixels or higher with aspect ratios such as 2:1, 2.4:1, 16:9, etc., and a capability for capturing motion images at resolutions up to about "6K" or higher including for example, but without limitation, 6K (2:1, 2.4:1), 5K (Full Frame, 2:1, 2.4:1 and Anamorphic 2:1), 4.5K (2.4:1), 4K (16:9, HD, 2:1 and Anamorphic 2:1), 3K (16:9, 2:1 and Anamorphic 2:1), 2K (16:9, 2:1 and Anamorphic 2:1), 1080p RGB (16:9), 720p RGB (16:9) and other resolutions and formats, depending on the size of the image sensor used in the device 10 and the capacity of the supporting electronics. Additionally, the device 10 can be configured to include a number of compression options, including compressed raw mosaic image sensor data, compressed fully rendered video data and uncompressed video data. An onboard memory preferably comprises a capacity of at least about 64 GB, and, in one implementation, at least about 128 GB. The phone includes a slot or cavity for receiving at least one, and preferably two or more SIM cards, to enable the phone to receive two or more phone numbers. Two cameras are provided, one facing outwardly from the front of the phone and one facing outwardly from the rear of the phone.

With continued reference to FIGS. 7A and 7B, the device 10 can include one or more lights which, optionally, can be used for personal lighting (e.g., flashlight) or photographic purposes. For example, as noted above, the device 10 can include a camera lens 84. Optionally, the device 10 can include a lighting device 200 disposed on the front side of the device 10, facing the same direction as the lens 84. The lighting device 200 can be any type of lighting device, and in some embodiments, is configured for high intensity "flash" output such as that used for "flash photography". Additionally, in some embodiments, the lighting device 200 can also be configured for continuous operation, such as in a flashlight mode for providing lighting as desired by user. Similarly, the lighting device 200 can be configured for continuous operation during use of the camera lens 84 for recording motion video. In some embodiments, the lighting device 200 can be in the form of one or plurality of LEDs. The design and operation of this type of lighting device, including those designs based on LEDs, is well known in the art.

Optionally, as illustrated in FIG. 7A, the lighting device 200 can extend around the periphery of the camera lens 84 in connection with a first camera 151, described below with reference to FIG. 9. As such, the lighting device 200 can provide an effect similar to that provided by lighting devices known as "ring lights" or "ring flashes". In some embodiments, the lighting device 200 can be constructed using two or more light emitting devices, such as LEDs, and an optical diffuser such as a transparent material with a frosted surface application. Further, the lighting device 200 can include light emitting devices configured to be adjustable as to the color or temperature of light emitted therefrom. For example, the light emitting devices included within the lighting device 200 can be configured to emit different "temperatures" of white light typically used for photography. Additionally, the lighting device 200 can be configured to emit a large range of different colors of light, using "RGB" LEDs light emitting devices. Such LED devices as well as the operation control of which are widely known and commercially available.

In some embodiments, the device 10 can include a lighting device 202. As shown in the illustrated embodiment of FIG. 7A, the lighting device 202 can include a circumferentially extending configuration. For example, the lighting device 202 can extend around the display 22. In a similar fashion or the same fashion as the lighting device 200, the lighting device 202 can be constructed with a plurality of light emitting devices, such as LEDs, which can be white, adjustable within a range of temperatures of white colors, or a broad range of colors such as "RGB" LED lighting devices. Additionally, the lighting device 202 can be configured for control is a "flash" mode for photography, in a flashlight mode, or other modes for continuous or substantially continuous output of light for personal lighting applications such as recording motion video as desired. Additionally, the device 10 can include programming for operating the lighting device 202 for further entertainment purposes, such as light changing schemes which may or may not be synchronized with audio output from the device 10. Such control options and techniques are well known in the art.

As an alternative to or in combination with the lighting devices 200, 202, the device 10 can also include a lighting device 204. As shown in FIG. 7A, the lighting device 204 can be disposed along the peripheral edge of the device 10. In the illustrated embodiment, the lighting device 204 follows along the shape of the outer periphery of the vice 10 and that includes or defines part of the concavities 26. Additionally, similarly to the lighting device 202, the lighting device 204 can include a plurality of light emitting devices, such as LEDs, covered with a translucent cover for diffusing light emitted by the light imaging devices. In other embodiments, as alternatives to or in combination with any of the lighting devices 200, 202, 204, the device 10 can include light imaging devices placed atop one or more of the screws 76 described above.

With reference to FIG. 7B, the backside of the device 10 can include a camera lens 85, for example, for use in conjunction with a second camera 152, described below with reference to FIG. 9. Using a similar or identical construction as the lighting device 200, the device 10 can also include a light lighting device 206 disposed partially or entirely around a periphery of the lens 85. Further, as an alternative to or in combination with the lighting device 206, the device 10 can include a lighting device 208 extending around a periphery of the backside of the device 10. The lighting device 208 can be constructed in a similar or identical fashion to the lighting devices 200, 202, or two of four noted above.

By providing a lighting device with a more diffused light emission characteristics, such as that resulting from the ring-shaped lighting devices 200, 206 or the more rectangular lighting devices 202, 204, 208 or even the use of a plurality of lighting devices disposed at a plurality of points relative to a camera lens, such as the camera lens 84, 85, different lighting aesthetics can be achieved. In some photographic techniques, the use of more diffused lighting can provide enhanced and or more desirable results, for example, by generating shadows with softer edges, and/or other effects.

Figure 7E:
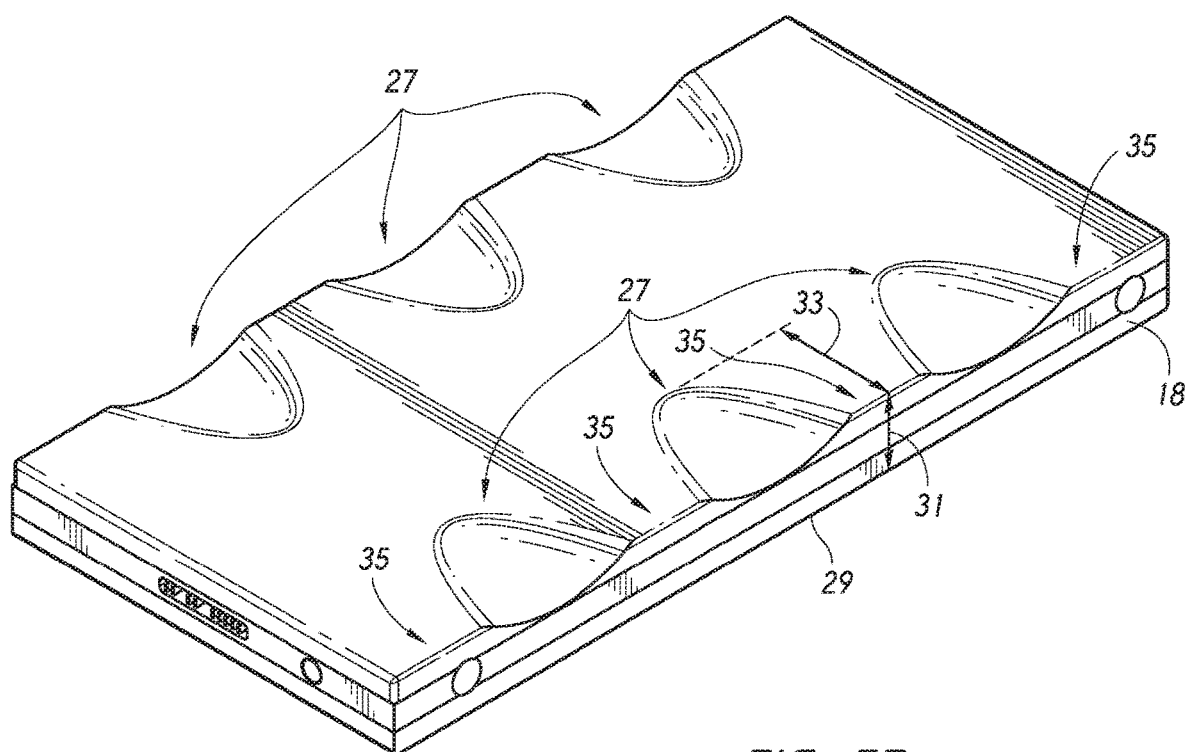
Figure 7F:
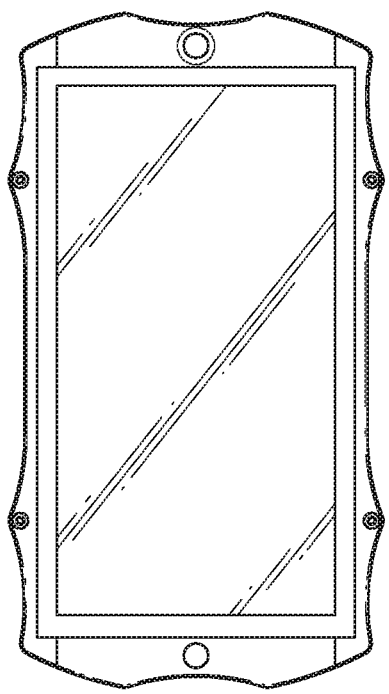
Figure 7G:
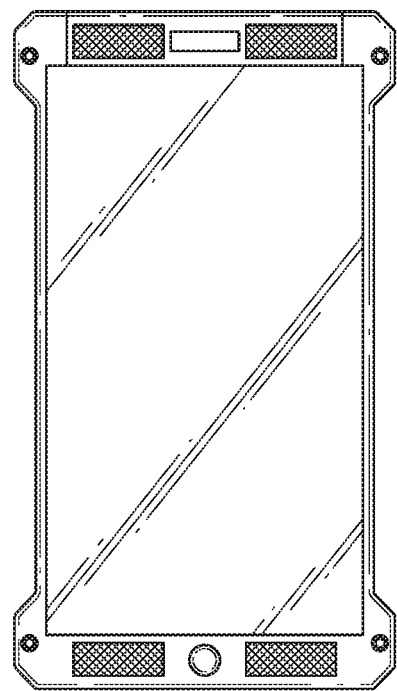
Figure 7H:
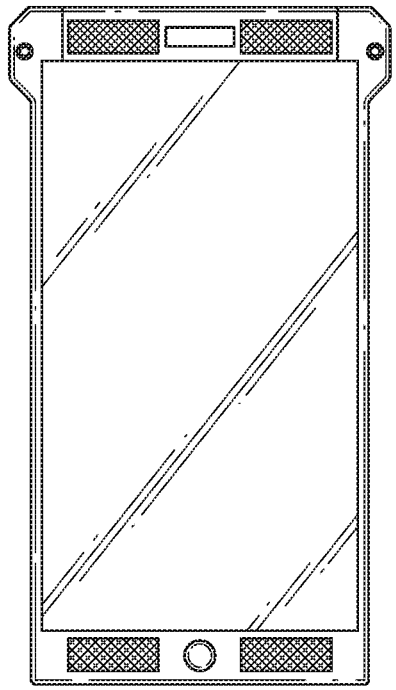
Figure 71:
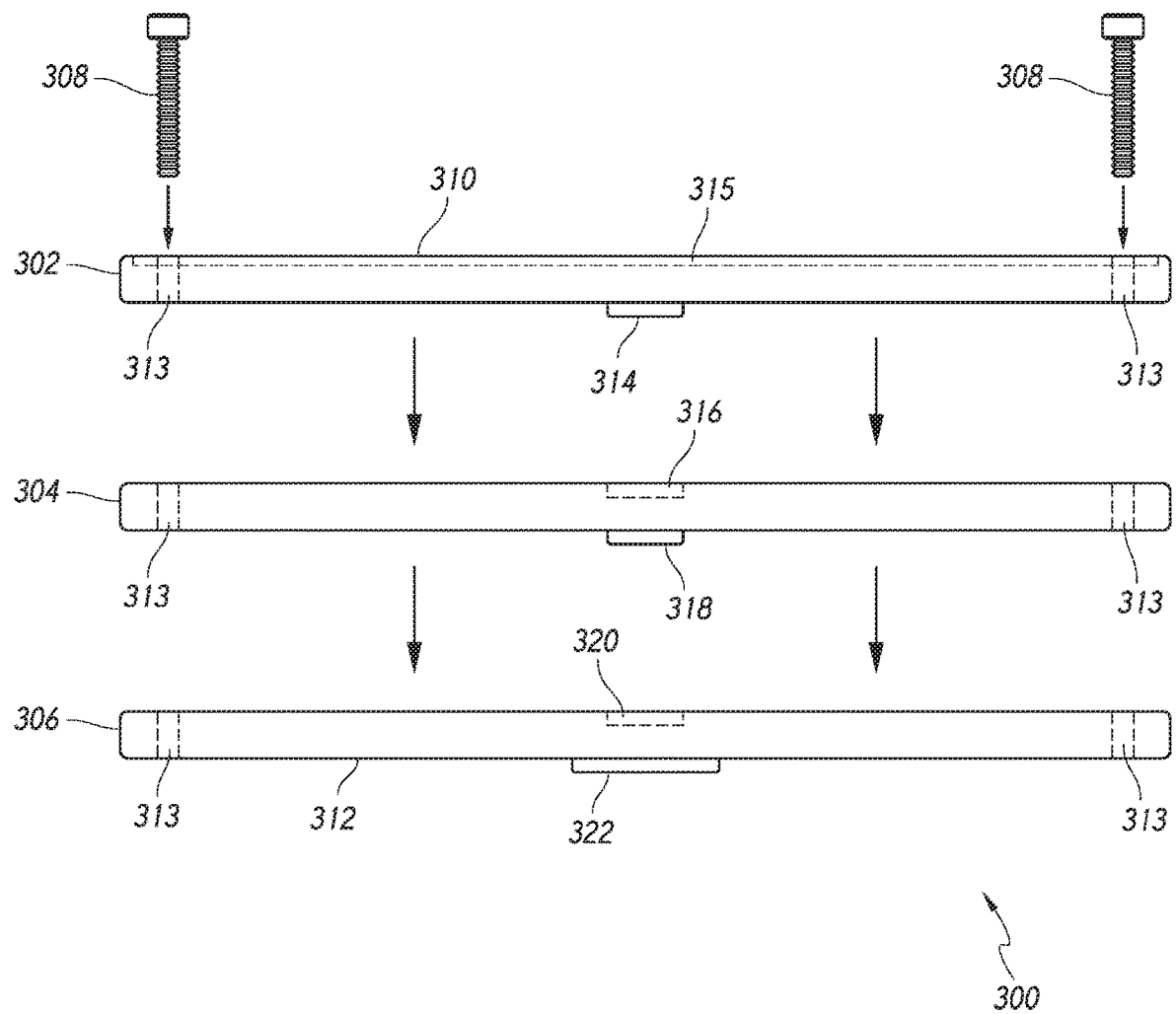

With reference to FIG. 7E, in some embodiments, the device 10 can include concavities 27 which do not extend onto the front side of the device 10. For example, FIG. 7E illustrates an alternative embodiment in which the concavities 26 are in the form of concavities 27 defined in the back surface of the device 10 as well as one or both of the sides 18, 20. FIG. 7E illustrates a plurality of concavities 27 which are defined partly on the backside of the device 10 and on the left side 18. However, an edge 29 between the left side 18 in the front side of the device 10 extends along a generally straight line. That is because, in the illustrated embodiment, the concavities 27 do not extend beyond the edge 29 or onto the front side of the device 10. Thus, the embodiment of the device 10 illustrated in FIG. 7E, would appear to be rectangular in a top plan view, in other words, the concavities 27 would generally not be visible in a top plan view of the front side (the view corresponding to FIG. 7A).

In some embodiments, the concavities 27 can have a maximum depth 31 of approximately 75% of the thickness of the device 10, however, other depths can also be used. Additionally, the concavities 27 can have a length 33 smaller than the magnitude of the depth 31, approximately the same magnitude as the depth 31, or up to 2 to 3 times the magnitude of the depth 31. However, other configurations of the concavities 27 can also be used. In the context of the embodiment of FIG. 7E, the raised areas adjacent to the concavities 27 can be considered as forming projections 35 on the left side 18, defining the concavities 27 therebetween.

Figure 9:
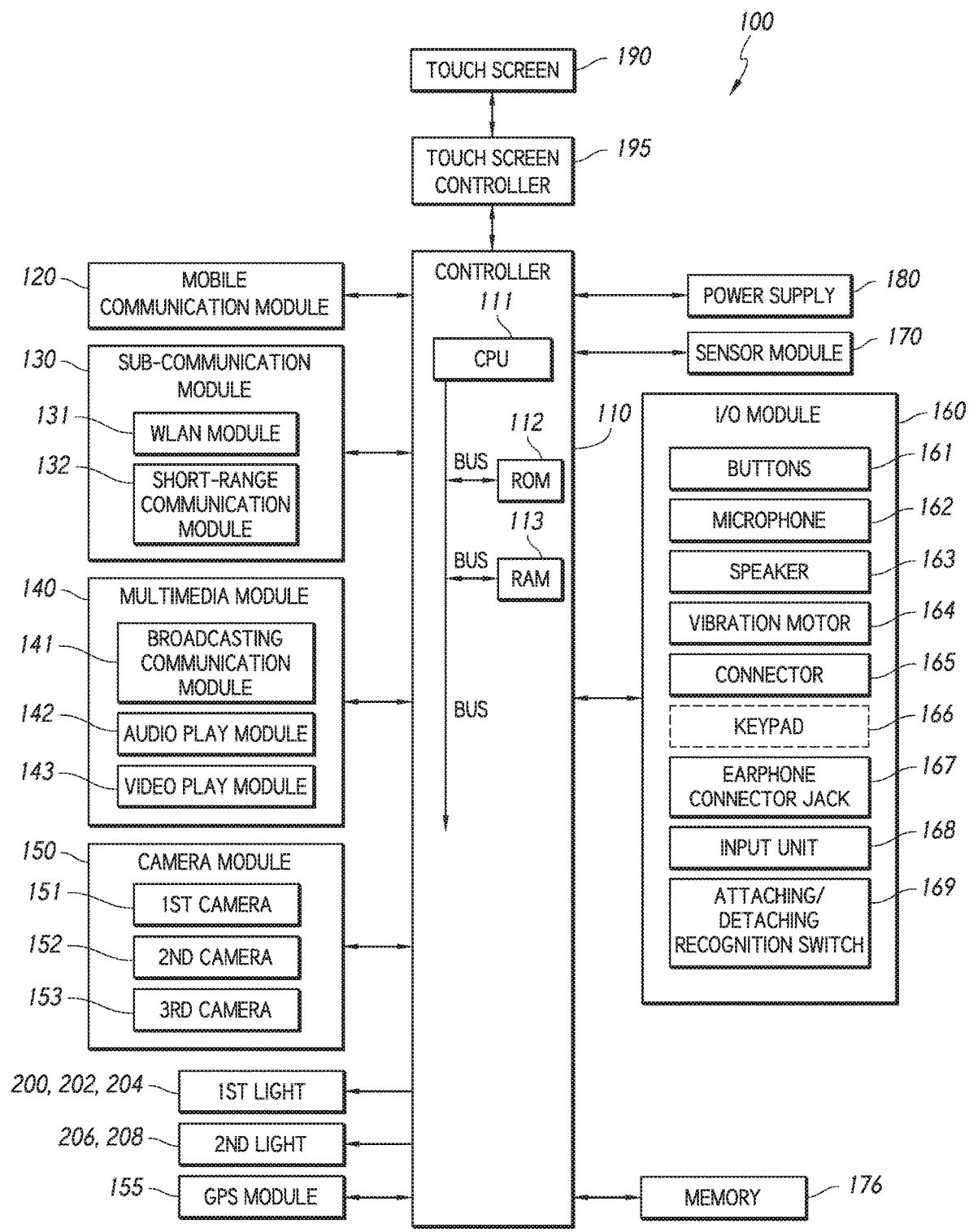
FIG. 9 is a block diagram illustrating various electronic aspects and features of a device in accordance with embodiments.

FIG. 9 is a block diagram illustrating various additional electronic aspects and features of a device according to an embodiment of the present disclosure. The housing of the embodiments described above may be utilized with electronic devices having any of a variety of features, and the following is illustrative only and not limiting on the present inventions. Additional details of potential electronic aspects can be found, for example, in U.S. Patent Publication No. 2014/0055394, published Feb. 27, 2014, the contents of which are incorporated by reference in their entirety herein.

Referring to FIG. 9, an electronic device 100 such as a cellphone in accordance with an embodiment may be connected to an external device by using an external connection device, such as a sub-communication module 130, a connector 165, and an earphone connecting jack 167. The "external device" may include a variety of devices, such as earphones, external speakers, Universal Serial Bus (USB) memories, chargers, cradles/docks, Digital Multimedia Broadcasting (DMB) antennas, electronic payment related devices, health care devices (e.g., blood sugar testers), game consoles, vehicle navigations, and the like, which are removable from the electronic device and connected thereto via a cable. The "external device" may also include a short range communication device that may be wirelessly connected to the electronic device 100 via short range communication, such as BLUETOOTH, a short range wireless communications technology at the 2.4 GHz band, commercially available from the BLUETOOTH SPECIAL INTEREST GROUP, INC., a Near Field Communication (NFC), and the like, and a communication device using WI-FI DIRECT, a wireless technology for data exchange over a computer network, commercially available from the WI-FI ALLIANCE, a wireless Access Point (AP), and the like. Furthermore, the external device may include any other device, such as a cell phone, a smartphone, a tablet PC, a desktop PC, a server, and the like.

Referring to FIG. 9, the electronic device 100 includes a display unit 190 and a display controller 195. The electronic device 100 also includes a controller 110, a mobile communication module 120, the sub-communication module 130, a multimedia module 140, a camera module 150, a Global Positioning System (GPS) module 155, an input/output module 160, a sensor module 170, a storage 175, and a power supply 180. The sub-communication module 130 includes at least one of Wireless Local Area Network (WLAN) 131 and a short-range communication module 132, and the multimedia module 140 includes at least one of a broadcast communication module 141, an audio play module 142, and a video play module 143. The camera module 150 includes at least one of a first camera 151, a second camera 152, a third camera 153 and the input/output module 160 includes at least one of buttons 161, a microphone 162, a speaker 163, a vibration motor 164, the connector 165, and a keypad 166. In some embodiments, the second and third cameras 152, 153 can both be disposed on the backside of the device 10, so to accommodate various types of photographic tools, including 3-D still photography or motion video, as well as other types of effects. Additionally, the electronic device 100 can include one or more lights, for example, the lights 200, 202, 204 described above are schematically illustrated as a "first light". Additionally, the lighting devices 206, 208 are schematically illustrated as a "second light".

The controller 110 may include a Central Processing Unit (CPU) 111, a Read Only Memory (ROM) 112 for storing a control program, such as an Operating System (OS), to control the electronic device 100, and a Random Access Memory (RAM) 113 for storing signals or data input from an external source or for being used as a memory space for working results in the electronic device 100. The CPU 111 may include a single core, dual cores, triple cores, or quad cores. The CPU 111, ROM 112, and RAM 113 may be connected to each other via an internal bus.

The controller 110 may control the mobile communication module 120, the sub-communication module 130, the multimedia module 140, the camera module 150, the GPS module 155, the input/output module 160, the sensor module 170, the storage 175, the power supply 180, the display unit 190, and the display controller 195.

The mobile communication module 120 connects the electronic device 100 to an external device through mobile communication using at least a one-to-one antenna or a one-to-many antenna under the control of the controller 110. The mobile communication module 120 transmits/receives wireless signals for voice calls, video conference calls, Short Message Service (SMS) messages, or Multimedia Message Service (MMS) messages to/from a cell phone, a smartphone, a tablet PC, or another device, with the phones having phone numbers entered into the electronic device 100.

The sub-communication module 130 may include at least one of the WLAN module 131 and the short-range communication module 132. For example, the sub-communication module 130 may include either the WLAN module 131 or the-short range communication module 132, or both.

The WLAN module 131 may be connected to the Internet in a place where there is a wireless Access Point (AP), under the control of the controller 110. The WLAN module 131 supports the WLAN Institute of Electrical and Electronic Engineers (IEEE) 802.11x standard. The short-range communication module 132 may conduct short-range communication between the electronic device 100 and an image rendering device under the control of the controller 110. The short-range communication may include communications compatible with BLUETOOTH, a short range wireless communications technology at the 2.4 GHz band, commercially available from the BLUETOOTH SPECIAL INTEREST GROUP, INC., Infrared Data Association (IrDA), WI-FI DIRECT, a wireless technology for data exchange over a computer network, commercially available from the WI-FI ALLIANCE, NFC, and the like.

The electronic device 100 may include at least one of the mobile communication module 120, the WLAN module 131, and the short-range communication module 132 based on the performance requirements of the electronic device 100. For example, the electronic device 100 may include a combination of the mobile communication module 120, the WLAN module 131, and the short-range communication module 132 based on the performance requirements of the electronic device 100.

The multimedia module 140 may include the broadcast communication module 141, the audio play module 142, or the video play module 143. The broadcast communication module 141 may receive broadcast signals (e.g., television broadcast signals, radio broadcast signals, or data broadcast signals) and additional broadcast information (e.g., an Electric Program Guide (EPG) or an Electric Service Guide (ESG)) transmitted from a broadcasting station through a broadcast communication antenna under the control of the controller 110. The audio play module 142 may play digital audio files (e.g., files having extensions, such as mp3, wma, ogg, or way) stored or received under the control of the controller 110. The video play module 143 may play digital video files (e.g., files having extensions, such as mpeg, mpg, mp4, avi, move, or mkv) stored or received under the control of the controller 110. The video play module 143 may also play digital audio files.

The multimedia module 140 may include the audio play module 142 and the video play module 143 except for the broadcast communication module 141. The audio play module 142 or video play module 143 of the multimedia module 140 may be included in the controller 110.

The camera module 150 may include at least one of the first camera 151 and the second camera 152 for capturing still images or video images under the control of the controller 110. Furthermore, the first or second camera 151 or 152, respectively, may include an auxiliary light source (e.g., a flash) for providing an amount of light for capturing an image. The first camera 151 may be placed on the front of the electronic device 100 and the second camera 152 may be placed on the back of electronic device 100. Alternatively, the first and second cameras 151 and 152, respectively, are arranged adjacent to each other (e.g., the distance between the first and second cameras 151 and 152, respectively, may be in the range of 1 cm. to 8 cm.), capturing 3 Dimensional (3D) still images or 3D video images.

The GPS module 155 receives radio signals from a plurality of GPS satellites in orbit around the Earth, and may calculate the position of the electronic device 100 by using time of arrival from the GPS satellites to the electronic device 100.

The input/output module 160 may include at least one of the plurality of buttons 161, the microphone 162, the speaker 163, the vibrating motor 164, the connector 165, and the keypad 166.

The at least one of the buttons 161 may be arranged on the front, side or back of the housing of the electronic device 100, and may include at least one of a power/lock button, a volume button, a menu button, a home button, a back button, and a search button.

The microphone 162 generates electric signals by receiving voice or sound under the control of the controller 110.

The speaker 163 may output sounds externally corresponding to various signals (e.g., radio signals, broadcast signals, digital audio files, digital video files or photography signals) from the mobile communication module 120, sub-communication module 130, multimedia module 140, or camera module 150 under the control of the controller 110. The speaker 163 may output sounds (e.g., button-press sounds or ringback tones) that correspond to functions performed by the electronic device 100. There may be one or multiple speakers 163 arranged in at least one position on or in the housing of the electronic device 100.

The vibrating motor 164 may convert an electric signal to a mechanical vibration under the control of the controller 110. For example, the electronic device 100 in a vibrating mode operates the vibrating motor 164 when receiving a voice call from another device. There may be at least one vibration motor 164 inside the housing of the electronic device 100. The vibration motor 164 may operate in response to a touch activity or continuous touches of a user over the display unit 190.

The connector 165 may be used as an interface for connecting the electronic device 100 to the external device or a power source. Under the control of the controller 110, the electronic device 100 may transmit data stored in the storage 175 of the electronic device 100 to the external device via a cable connected to the connector 165, or receive data from the external device. Furthermore, the electronic device 100 may be powered by the power source via a cable connected to the connector 165 or may charge the battery using the power source.

The keypad 166 may receive key inputs from the user to control the electronic device 100. The keypad 166 includes a mechanical keypad formed in the electronic device 100, or a virtual keypad displayed on the display unit 190. The mechanical keypad formed in the electronic device 100 may optionally be omitted from the implementation of the electronic device 100, depending on the performance requirements or structure of the electronic device 100.

An earphone may be inserted into the earphone connecting jack 167 and thus, may be connected to the electronic device 100.

A stylus pen 168 may be inserted and removably retained in the electronic device 100, and may be drawn out and detached from the electronic device 100.

A pen-removable recognition switch 169 that operates in response to attachment and detachment of the stylus pen 168 is equipped in an area inside the electronic device 100 where the stylus pen 168 is removably retained, and sends a signal that corresponds to the attachment or the detachment of the stylus pen 168 to the controller 100. The pen-removable recognition switch 169 may have a direct or indirect contact with the stylus pen 168 when the stylus pen 168 is inserted into the area. The pen-removable recognition switch 169 generates the signal that corresponds to the attachment or detachment of the stylus pen 168 based on the direct or indirect contact and provides the signal to the controller 110.

The sensor module 170 includes at least one sensor for detecting a status of the electronic device 100. For example, the sensor module 170 may include a proximity sensor for detecting proximity of a user to the electronic device 100, an illumination sensor for detecting an amount of ambient light of the electronic device 100, a motion sensor for detecting the motion of the electronic device 100 (e.g., rotation of the electronic device 100, acceleration or vibration applied to the electronic device 100), a geomagnetic sensor for detecting a point of the compass using the geomagnetic field, a gravity sensor for detecting a direction of gravity, and an altimeter for detecting an altitude by measuring atmospheric pressure. At least one sensor may detect the status and generate a corresponding signal to transmit to the controller 110. The sensor of the sensor module 170 may be added or removed depending on the performance requirements of the electronic device 100 of the electronic device 100.

The storage 175 may store signals or data input/output according to operations of the mobile communication module 120, the sub-communication module 130, the multimedia module 140, the camera module 150, the GPS module, the input/output module 160, the sensor module 170, the display unit 190 under the control of the controller 110. The storage 175 may store the control programs and applications for controlling the electronic device 100 or the controller 110.

The term "storage" refers to the storage 175, and also to the ROM 112, RAM 113 in the controller 110, or a memory card (e.g., a Secure Digital (SD) card, a memory stick, and the like) installed in the electronic device 100. The storage may also include a non-volatile memory, a volatile memory, a Hard Disc Drive (HDD), a Solid State Drive (SSD), or the like.

The power supply 180 may supply power to at least one battery placed inside the housing of the electronic device 100 under the control of the controller 110. The at least one battery powers the electronic device 100. The power supply 180 may supply the electronic device 100 with the power input from the external power source via a cable connected to the connector 165. The power supply 180 may also supply the electronic device 100 with wireless power from an external power source using a wireless charging technology.

The display controller 195 receives information (e.g., information to be generated for making calls, data transmission, broadcast, or photography) that is processed by the controller 110, converts the information to data to be displayed on the display unit 190, and provides the data to the display unit 190. The display unit 190 displays the data received from the display controller 195. For example, in a call mode, the display unit 190 may display a User Interface (UI) or a Graphic User Interface (GUI) with respect to a call. The display unit 190 may include at least one of liquid crystal displays, thin film transistor-liquid crystal displays, organic light-emitting diodes, flexible displays, 3D displays, electrophoretic displays, and the like.

The display unit 190 may be used as an output device and also as an input device, and for the latter case, may have a touchscreen panel to operate as a touch screen. The display unit 190 may send to the display controller 195 an analog signal that corresponds to at least one touch to the UI or GUI. The display unit 190 may detect the at least one touch by a user's physical contact (e.g., by fingers including a thumb) or by a touchable input device (e.g., the stylus pen). The display unit 190 may also receive a dragging movement of a touch among at least one touch and transmit an analog signal that corresponds to the dragging movement to the display controller 195. The display unit 190 may be implemented to detect at least one touch in, for example, a resistive method, a capacitive method, an infrared method, an acoustic wave method, or the like.

The term 'touches' are not limited to physical touches by a physical contact of the user or contacts with the touchable input device, but may also include touchless proximity (e.g., maintaining a detectable distance less than 1 mm. between the display unit 190 and the user's body or touchable input device). The detectable distance from the display unit 190 may vary depending on the performance requirements of the electronic device 100 or structure of the electronic device 100, and more particularly, the display unit 190 may output different values (e.g., current values) for touch detection and hovering detection to distinguishably detect that a touch event occurred by a contact with the user's body or the touchable input device and a contactless input (e.g., a hovering event). Furthermore, the display unit 190 may output different values (e.g., current values) for hovering detection over distance from where the hovering event occurs.

The display controller 195 converts the analog signal received from the display unit 190 to a digital signal (e.g., in XY coordinates on the touch panel or display screen) and transmits the digital signal to the controller 110. The controller 110 may control the display unit 190 by using the digital signal received from the display controller 195. For example, in response to the touch event or the hovering event, the controller 110 may enable a shortcut icon displayed on the display unit 190 to be selected or to be executed. The display controller 195 may also be incorporated in the controller 110.

Further, the display controller 195 may determine the distance between where the hovering event occurs and the display unit 190 by detecting a value (e.g., a current value) output through the display unit 190, convert the determined distance to a digital signal (e.g., with a Z coordinate), and provide the digital signal to the controller 110.

Furthermore, depending on implementations, the electronic device 100 may have two or more display units.

The display unit 190 may include at least two touchscreen panels for detecting touches or proximity thereto by the user's body or the touchable input device to receive both inputs by the user's body or the touchable input device simultaneously. The at least two touchscreen panels provide different output values to the display controller 195, and the display controller 195 may differentiate inputs by the user's body and inputs by the touchable input device through the touchscreen by differently recognizing the values input from the at least two touchscreen panels.

Any of the handheld electronic devices described herein, including those described with respect to FIGS. 1-7E, can incorporate some or all of the components and corresponding functionality shown and described with respect to FIG. 9. Moreover, while certain electronic devices shown and described herein are cellphones, other handheld electronic device embodiments are not cellphones, and do not include telephonic capability. For instance, some embodiments have the same or similar exterior as the devices shown and described with respect to any of FIGS. 1-7E, but do not include telephonic capability, such as in the case of a tablet computing device or digital camera. Such embodiments may nonetheless include any combination of the non-telephone components and functionality described with respect to FIG. 9, such as one or more of the following or portions thereof: controller 110, touch screen 190 and touch screen controller 195, camera module 150, multimedia module 140, sub-communication module 130, first light 200, 202, 204, second light 206, 208, GPS module 155, I/O module 160, and memory 176.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, or, any processor, controller, microcontroller, or state machine. A processor also may be implemented as a combination of electronic devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. Storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments is not intended to be exhaustive or to be limiting to the precise form disclosed above. While specific embodiments and examples are described above for illustrative purposes, various equivalent modifications are possible within the scope of the inventions described herein, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings provided herein can be applied to other systems, not only the systems described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A cellphone with enhanced grip surface structures, the cellphone comprising:
   a body having a top half above a bottom half, the body including:
   a front surface with a display;
   a rear surface including a support configured to engage a removable lens that projects outwardly from the rear surface;
   a first side provided with enhanced grip surface structures that comprise at least three extensions projecting from the first side that define at least first and second concavities of the first side, wherein at least the first concavity of the first side is positioned within the top half of the body and at least the second concavity of the first side is positioned within the bottom half of the body, the first and second concavities of the first side at least about 0.5 inches wide and having a substantially continuous radius of curvature with a range of about 0.5 inches to about 2.0 inches; and
   a second side.

2. The cellphone with enhanced grip surface structures of claim 1 wherein the second side of the body is provided with the enhanced grip surface structures that further comprise at least three extensions projecting from the second side that define at least first and second concavities of the second side.

3. The cellphone with enhanced grip surface structures of claim 2 wherein at least the first concavity of the first side and the first concavity of the second side define a first pair of concavities positioned within the top half of the body, and at least the second concavity of the first side and the second concavity of the second side define a second pair of concavities positioned within the bottom half of the body.

4. The cellphone with enhanced grip surface structures of claim 1 wherein the first and second concavities of the first side are symmetrically spaced along a length of the cellphone.

5. The cellphone with enhanced grip surface structures of claim 1 wherein the support forms a female portion of an inverted positive lock mounting system.

6. The cellphone with enhanced grip surface structures of claim 1 wherein the support is configured to engage the removable lens via a lens mount adapter.

7. The cellphone with enhances grip surface structures of claim 6 wherein the lens mount adapter forms a male portion of an inverted positive lock mounting system.

8. The cellphone with enhanced grip surface structures of claim 1 wherein the first concavity has a first width of at least 30% of height of the body.

9. A mobile communication device comprising:
   a touch screen display and a camera;
   electronics connected to the touch screen display;
   electronics connected to the camera;
   housing enclosing the electronics connected to the touch screen display and the electronics connected to the camera, the housing comprising a first side and a second side, wherein the first side of the housing includes at least one concavity of the first side formed in a rear plate of the housing, the rear plate including a support configured to engage a removable lens, the at least one concavity of the first side at least about 0.5 inches wide and having a substantially continuous radius of curvature with a range of about 0.5 inches to about 2.0 inches.

10. The mobile communication device of claim 9 wherein the second side of the housing includes at least a second concavity formed in the rear plate of the housing.

11. The mobile communication device of claim 9 wherein the at least one concavity of the first side is formed to receive a user's finger.

12. The mobile communication device of claim 9 wherein the support forms a female portion of an inverted positive lock mounting system.

13. The mobile communication device of claim 9 further comprising a lens mount adapter, wherein the support is configured to engage the removable lens via the lens mount adapter.

14. The mobile communication device of claim 13 wherein the lens mount adapter forms a male portion of an inverted positive lock mounting system.

15. A housing for a mobile communication device having a touch screen display and a camera, the housing comprising:
   at least first, second, third, fourth and fifth projections defining first, second, third, and fourth concavities, wherein the first and second concavities are disposed on an upper half of a body of the cellphone and the third and fourth concavities are disposed on a lower half of the body of the mobile communication device, each of the first, second, third, and fourth concavities having a substantially continuous radius of curvature with a range of about 0.5 inches to about 2.0 inches; and
   a rear surface that includes a support configured to engage a removable lens that projects outwardly from the rear surface.

16. The housing of claim 15 wherein the support forms a female portion of an inverted positive lock mounting system.

17. The housing of claim 16 wherein the support is configured to engage the removable lens via a lens mount adapter.

18. The housing of claim 17 wherein the lens mount adapter forms a male portion of the inverted positive lock mounting system.

19. A mobile communication device comprising:
   a body having a top half above a bottom half, the body including:
   a front surface with a display;
   a rear surface;

a first side comprising at least two extensions projecting from the first side that define at least a first concavity on the first side, wherein at least the first concavity on the first side is positioned within the top half of the body; and wherein the first concavity is at least about 0.5 inches wide and has a substantially continuous radius of curvature with a range of about 0.5 inches to about 2.0 inches.

20. The cellphone of claim 19, wherein the first concavity is formed on the first side on the rear surface.

21. The cellphone of claim 20, wherein the second concavity is formed on the first side on the rear surface.

22. The cellphone of claim 21, wherein a third concavity is formed on a second side opposite the first side on the rear surface.

23. The cellphone of claim 22, wherein a fourth concavity is formed on the second side opposite the first side on the rear surface such that the third concavity is positioned within the top half of the body and the fourth is positioned within the bottom half of the body.

\* \* \* \* \*